US012435500B2

(12) United States Patent
Yang

(10) Patent No.: US 12,435,500 B2
(45) Date of Patent: Oct. 7, 2025

(54) FLUSHING METHOD FOR TOILET, AND FLUSHING TOILET

(71) Applicant: Zhifeng Yang, Fengcheng (CN)

(72) Inventor: Zhifeng Yang, Fengcheng (CN)

( * ) Notice: Subject to any disclaimer, the term of this patent is extended or adjusted under 35 U.S.C. 154(b) by 312 days.

(21) Appl. No.: 17/914,220

(22) PCT Filed: Mar. 24, 2021

(86) PCT No.: PCT/CN2021/082786
§ 371 (c)(1),
(2) Date: Sep. 23, 2022

(87) PCT Pub. No.: WO2021/190575
PCT Pub. Date: Sep. 30, 2021

(65) Prior Publication Data
US 2023/0349137 A1    Nov. 2, 2023

(30) Foreign Application Priority Data

Mar. 25, 2020 (CN) .......................... 202010216544.7
Feb. 18, 2021 (CN) .......................... 202110187612.6
Mar. 7, 2021 (CN) .......................... 202110248198.5

(51) Int. Cl.
*E03D 1/38* (2006.01)
(52) U.S. Cl.
CPC ..................... *E03D 1/38* (2013.01)
(58) Field of Classification Search
CPC .... E03D 9/14; E03D 3/00; E03D 1/28; E03D 1/0125; E03D 11/13; E03D 5/003; E03D 5/006; E03D 5/012; E03D 2201/00
See application file for complete search history.

(56) References Cited

U.S. PATENT DOCUMENTS 2,979,731 A *  4/1961  Reetz .................. E03D 1/28
                                                4/432
10,704,243 B2 *  7/2020  Kashirajima ......... E03D 1/0125

FOREIGN PATENT DOCUMENTS

| CN | 2518928 Y | 10/2002 |
|---|---|---|
| CN | 102564486 A | 7/2012 |
| CN | 202416465 U | 9/2012 |
| CN | 106120994 A | 11/2016 |
| CN | 107299664 A | 10/2017 |
| CN | 109339172 A | 2/2019 |
| CN | 109610588 A | 4/2019 |
| CN | 209066561 U | 7/2019 |

(Continued)

OTHER PUBLICATIONS

International Search Report, PCT/CN2021/082786, Jun. 22, 2021, 6 pages.

*Primary Examiner* — Erin Deery

(57) ABSTRACT

Disclosed are a flushing method for a toilet, and a flushing toilet. A toilet bowl (1) is provided at the lower end thereof with a trap (4), a sewage receiving area (6), is provided on a side, of the upper end of the trap (4) and in an area with a certain height; a water flushing port (7) is provided in the upper end of the sewage receiving area (6); and a water storage cavity (5) is formed among a toilet body (2), the toilet bowl (1) and a toilet bottom (3), a water inlet system is arranged at the rear end of the water storage cavity (5), the water flushing port (7) is in communication with the water storage cavity (5), and a water valve and a water valve control device are arranged at an intake end of the flushing port (7).

18 Claims, 21 Drawing Sheets

(56) References Cited

FOREIGN PATENT DOCUMENTS

| CN | 209817020 U | 12/2019 |
|----|-------------|---------|
| JP | 2002088884 A | 3/2002 |
| JP | 2011111780 A | 6/2011 |

* cited by examiner

FLUSHING METHOD FOR TOILET, AND FLUSHING TOILET

CROSS REFERENCE TO RELATED APPLICATIONS

This patent application is a U.S. National Stage Application under 35 U.S.C. 371 of PCT Application No. PCT/CN2021/082786, filed Mar. 24, 2021, which claims the benefit and priority of Chinese Patent Application No. 202010216544.7, filed with the China National Intellectual Property Administration on Mar. 25, 2020; Application No. 202110187612.6, filed with the China National Intellectual Property Administration on Feb. 18, 2021; Application No. 202110248198.5, filed with the China National Intellectual Property Administration on Mar. 7, 2021, the disclosure of which is incorporated by reference herein in its entirety as part of the present application.

TECHNICAL FIELD

The present disclosure relates to the field of sanitary appliance, in particular to a flushing method for a toilet, and a flushing toilet.

BACKGROUND

In the prior art, a toilet is generally flushed in a one-time, large-displacement and large-force water flushing mode after defecation is completed. Due to the fact that much sewage is accumulated, in order to prevent blockage, the inner diameter of a trap needs to be larger generally, the section of a water seal is larger generally, and therefore when the water flushing amount is not large enough, the sewage usually rotates in the water seal and is flushed away with a large amount of flushing water. In addition, static sewage or even sewage adhered to the pool wall needs to be flushed away, and the flushing difficulty is further increased, so that the flushing force needs to be increased, and large flushing noise is generated at the same time. Another disadvantage of one-time flushing is that during defecation, if excrement directly falls into the water seal of the toilet, sewage splashes. When the excrement falls onto the pool wall above the water seal, a large amount of foul smells and harmful bacteria are emitted, and the longer the adhesion time of the sewage on the pool wall is, the more difficult the sewage is to be flushed. As a result, many users are used to flush water during defecation, but an existing direct flushing toilet is large in pushing force, water is likely to be splashed to the hip in the flushing process, rotating water flow in the siphon type toilet in the flushing process forms aerosol, bacteria are prone to invading human bodies along with the aerosol, and the water consumption of single flushing of the existing toilet is too large.

The toilet can be a common toilet or an intelligent toilet. A water tank is arranged above the rear part of the common toilet, the height of the toilet is increased by about 31 cm through the water tank, the length of the toilet is increased by about 21 cm through the water tank, and the overall layout of a small-area washroom is affected to a certain extent. The intelligent toilet is generally a toilet without a water tank, and is small, attractive in appearance and space-saving. The intelligent toilet is directly in communication with a water pipe, and is flushed with water pressure of tap water. Therefore, the requirement for water pressure is high. When the water pressure is low, the awkward event that sewage cannot be flushed is frequently generated.

Toilet is particularly prone to generating peculiar smells so that the toilet needs to be washed at an interval of a short period of time. The odor of the toilet is mainly generated due to the fact that sewage traces which are difficult to observe by naked eyes are not completely flushed when the toilet is flushed at one time, so that a large amount of bacteria are propagated. On the other hand, a wash basin is usually arranged beside the toilet, waste water discharged from the wash basin is discharged into a sewer pipe through a pipeline and a trap. The amount of waste water discharged from the wash basin of the toilet every day is large, and the waste water discharged from the wash basin every day can be actually used for flushing the toilet.

The toilet is usually only suitable for a sitting position, but more people are accustomed to a squatting position. An existing squatting and sitting dual-purpose toilet is complex in structure, and two modes need to be switched, so that the toilet is troublesome.

SUMMARY

Technical Problems

Aiming at the problems, the present disclosure provides a flushing method for a toilet and a flushing toilet. By means of kinetic energy generated when sewage falls, timely cooperation between flushing water flow blocking and flushing, and the optional guidance of to the speed and direction of the falling sewage, sewage can slide into a water seal with an extremely small amount of flushing water, or can be flushed away immediately with a small amount of flushing water, thereby saving on water and preventing sewage splashing and odor emission. Moreover, while the tank above the rear of the toilet is eliminated, the volume of the toilet is greatly reduced and more space is vacated for the washroom, the toilet does not require tap water pressure, a booster pump does not need to be used, the situation that sewage cannot be flushed away when the water pressure is low cannot occur, and the flushing noise is can greatly reduced. Furthermore, waste water in the wash basin is used for toilet flushing, a large amount of water is saved, and excess waste water in the wash basin also automatically flushes the inner wall of the toilet bowl, so that sewage and bacteria which are attached to the inner wall of the toilet bowl and are difficult to observe by naked eyes are flushed clean in time, and generation of peculiar smell of the toilet can be prevented. In addition, the sitting posture and the squatting posture can be adopted, and meanwhile the using habits of different crowds are considered.

Solutions to Solve the Problems

Technical Solutions

The present disclosure provides a flushing method for a toilet. The toilet comprises a toilet bowl 1, a toilet body 2 and a toilet bottom 3 integrally formed with the toilet bowl 1 and the toilet body 2, and a toilet bowl 1 is provided at the lower end thereof with a trap 4, wherein

- a sewage receiving area 6, which is inclined and is specially arranged for changing a sewage falling speed and direction, is provided on a side, corresponding to a sewage falling direction, of the upper end of a trap 4 and in an area with a certain height;
- a water sealing surface of the trap 4 is located below the sewage receiving area 6, and the aperture of the top end of the trap 4 is slightly larger than that of the water sealing surface;

a water flushing port 7 is provided in the upper end of the sewage receiving area 6;

a water storage cavity 5 is formed among the toilet body 2, the toilet bowl 1 and the toilet bottom 3;

the water flushing port 7 is in communication with the water storage cavity 5;

a water valve is arranged at an intake end of the water flushing port 7;

the toilet is also provided with a control device for controlling the opening and closing of the water valve and controlling the opening size of the water valve;

in addition, the toilet is further provided with a water inlet system for injecting water into the water storage cavity 5;

therefore, when small excrement is discharged, the water valve is opened slightly in front of the small excrement falling into the sewage receiving area 6 through the control device, so that the water storage cavity 5 flushes small-flow water into the sewage receiving area 6 through the water flushing port 7, and then the small excrement can slide into a water seal under the combined action of kinetic energy of the excrement, timely cooperation between small-flow flushing water flow blocking and flushing, and optimal guidance of the sewage receiving area 6 to the speed and direction of falling sewage, thereby preventing sewage splashing and odor emission; sewage traces left at the sewage receiving area 6 are also quickly flushed with small-flow flushing water, thereby preventing sewage attachment and odor emission; and when large excrement is discharged, the water valve is opened obviously in front of the large excrement falling into the sewage receiving area 6 through the control device, so that the water storage cavity 5 flushes large-flow water into the sewage receiving area 6 through the water flushing port 7, and then the large excrement can be discharged towards an outlet of the trap 4 under the combined action of kinetic energy of the excrement, timely cooperation between large-flow flushing water flow blocking and flushing, and optimal guidance of the sewage receiving area 6 to the speed and direction of falling sewage, so that sewage can be flushed away immediately with a small amount of flushing water, thereby saving on water and preventing sewage splashing and odor emission.

One side of the bottom, corresponding to the bottom of a sewage sliding track, of the trap 4, including the sewage receiving area 6, is integrally in a streamlined design; and when sewage slides into the water seal along the sewage receiving area 6 and then is discharged to a water outlet in the tail end of the trap 4, the moving track is a smooth and streamlined moving track.

A matched annular top cover 17 is buckled above the top of the toilet body 2 and the top of the toilet bowl 1;

the whole inner ring of the annular top cover 17 extends into the inner side of the top of the toilet bowl 1 by about 2 cm;

a water flushing tank 21 arranged around the inner ring of the annular top cover 17 and a water storage tank 23 arranged around the outer side of the water flushing tank 21 are arranged in the annular top cover 17;

a plurality of water outlet holes 22 are uniformly distributed in the inner side of the bottom of the water flushing tank 21, and the water outlet holes 22 respectively correspond to the inner side of the top of the toilet bowl 1;

a water rinsing port 26 is formed between the water flushing tank 21 and the water storage tank 23, and a second water valve is arranged at the water rinsing port 26;

in addition, the toilet is further provided with a second control device for controlling the opening and closing of the second water valve; and moreover, the toilet is further provided with a second water inlet system for supplying water for the water storage tank 23, and a water storage tank inlet end 24 is connected with the second water inlet system.

The second water inlet system comprises a water storage pipe 32 arranged between the water storage tank inlet end 24 and a water outlet of the wash basin of the washroom;

the pipe diameter height and the installation height of the water storage pipe 32 correspond to those of the water storage tank 23;

a water storage pipe inlet end 33 is connected with the water outlet of the wash basin of the washroom through a hose, and a water storage pipe outlet end 34 is connected with the water storage tank inlet end 24 through a hose;

a plurality of overflow ports 20a with the height of about 2 mm are formed between the upper end of the water flushing tank 21 and the upper end of the water storage tank 23, so that when the water storage pipe 32 and the water storage tank 23 are full of water, waste water continuously discharged into the water storage pipe 32 and the water storage tank 23 from the wash basin flows into the water flushing tank 21 through the overflow ports 20a and is discharged into the toilet bowl 1 through the water outlet holes 22, and the toilet bowl 1 is automatically flushed; and therefore, along with high-frequency use of the wash basin, the toilet bowl 1 is frequently and automatically flushed with waste water in the wash basin, sewage traces and bacteria which are difficult to be really flushed and are difficult to observe by naked eyes during normal toilet flushing are thoroughly flushed, generation of peculiar smell of the toilet is completely eradicated, and the problem that the toilet needs to be manually flushed frequently is solved.

The present disclosure also provides a flushing toilet, comprising a toilet bowl 1, a toilet body 2 and a toilet bottom 3 integrally formed with the toilet bowl 1 and the toilet body 2, and a toilet bowl 1 is provided at the lower end thereof with a trap 4, wherein a sewage receiving area 6, which is inclined and is specially arranged for changing a sewage falling speed and direction, is provided on a side, corresponding to a sewage falling direction, of the upper end of a trap 4 and in an area with a certain height;

a water sealing surface of the trap 4 is located below the sewage receiving area 6, and the aperture of the top end of the trap 4 is slightly larger than that of the water sealing surface;

a water flushing port 7 is provided in the upper end of the sewage receiving area 6;

a water storage cavity 5 is formed among the toilet body 2, the toilet bowl 1 and the toilet bottom 3;

the water flushing port 7 is in communication with the water storage cavity 5;

a water valve is arranged at an intake end of the water flushing port 7;

the toilet is also provided with a control device for controlling the opening and closing of the water valve and controlling the opening size of the water valve;

in addition, the toilet is further provided with a water inlet system for injecting water into the water storage cavity 5;

therefore, when small excrement is discharged, the water valve is opened slightly in front of the small excrement falling into the sewage receiving area 6 through the control device, so that the water storage cavity 5 flushes small-flow water into the sewage receiving area 6 through the water flushing port 7, and then the small excrement can slide into a water seal under the combined action of kinetic energy of the excrement, timely cooperation between small-flow flushing water flow blocking and flushing, and optimal guidance of the sewage receiving area 6 to the speed and direction of falling sewage, thereby preventing sewage splashing and odor emission; sewage traces left at the sewage receiving area 6 are also quickly flushed with small-flow flushing water, thereby preventing sewage attachment and odor emission; and when large excrement is discharged, the water valve is opened obviously in front of the large excrement falling into the sewage receiving area 6 through the control device, so that the water storage cavity 5 flushes large-flow water into the sewage receiving area 6 through the water flushing port 7, and then the large excrement can be discharged towards an outlet of the trap 4 under the combined action of kinetic energy of the excrement, timely cooperation between large-flow flushing water flow blocking and flushing, and optimal guidance of the sewage receiving area 6 to the speed and direction of falling sewage, so that sewage can be flushed away immediately with a small amount of flushing water, thereby saving on water and preventing sewage splashing and odor emission.

One side of the bottom, corresponding to the bottom of a sewage sliding track, of the trap 4, including the sewage receiving area 6, is integrally in a streamlined design; and when sewage slides into the water seal along the sewage receiving area 6 and then is discharged to a water outlet in the tail end of the trap 4, the moving track is a smooth and streamlined moving track.

The bottom of the toilet body 2 is attached to the ground, the toilet bottom 3 is flush with the bottom of the toilet body 2 or slightly higher than the bottom of the toilet body 2, and the trap 4 is generally located below the toilet bottom 3;

therefore, the distance between the water flushing port 7 and the hip and the distance between the sewage receiving area 6 and the hip are large enough, the kinetic energy generated when sewage makes contact with the sewage receiving area 6 is larger, and sewage can be flushed away with a smaller amount of flushing water; and therefore, the effective volume of the water storage cavity 5 can be greatly increased.

The water valve is composed of a circular ring 10 and a valve body 11, the outer circumferential surface of the circular ring 10 is connected with the inner circumferential surface of the water flushing port 7 in a sealed and embedded mode, the valve body 11 is rotatably hinged to the top of the circular ring 10, a rubber sheet 12 is arranged on the valve body 11, and when the free end of the valve body 11 rotates downwards until the rubber sheet 12 of the valve body 11 is attached to the top surface of the circular ring 10, the water valve is closed;

a torsion spring 13 is connected between the valve body 11 and the circular ring 10, and the acting force of the torsion spring 13 tends to close the water valve;

the control device comprises a fixed pulley 14 arranged on the rear side wall of the toilet body 2 and a flexible steel wire 15 of which the lower end is connected with the free end of the valve body 11;

the free end of the flexible steel wire 15 surrounds the fixed pulley 14 and extends out of the top of the right or left side wall of the toilet body 2 to the outer side of the toilet body 2;

a pull ring 16 is arranged at the end part of the free end of the flexible steel wire 15;

when the pull ring 16 is handheld and the free end of the valve body 11 is pulled to rotate upwards through the flexible steel wire 15 and the fixed pulley 14, the water valve is opened; and when the pull ring 16 is loosened, the free end of the valve body 11 rotates under the combined action of the self gravity of the valve body 11 and the torsion of the torsion spring 13 until the rubber sheet 12 of the valve body 11 is tightly attached to the top surface of the circular ring 10, and the water valve is closed.

A matched annular top cover 17 is buckled above the top of the toilet body 2 and the top of the toilet bowl 1;

the whole inner ring of the annular top cover 17 extends into the inner side of the top of the toilet bowl 1 by about 2 cm;

the annular top cover 17 is of a hollow box type structure and is composed of a box body 18 and a box cover 19 buckled with the box body 18;

a circle of annular partition plate 20 is arranged in the box body 18 and divides the box body 18 into two areas such as a water flushing tank 21 and a water storage tank 23;

a plurality of water outlet holes 22 are uniformly distributed in the inner side of the bottom of the water flushing tank 21, and the water outlet holes 22 respectively correspond to the inner side of the top of the toilet bowl 1;

a water rinsing port 26 is formed between the water flushing tank 21 and the water storage tank 23, and a second water valve is arranged at the water rinsing port 26;

in addition, the toilet is further provided with a second control device for controlling the opening and closing of the second water valve; and moreover, the toilet is further provided with a second water inlet system for supplying water for the water storage tank 23, and a water storage tank inlet end 24 is connected with the second water inlet system.

The second water valve is composed of a second valve body 27 which is rotatably hinged to the water rinsing port 26, the rubber sheet 28 is arranged on the second valve body 27, and when the free end of the second valve body 27 rotates until the rubber sheet 28 of the second valve body 27 is attached to the matched surface 26a of the water rinsing port 26, the second water valve body is closed;

a torsion spring 29 is connected between the second valve body 11 and the annular partition plate 10, and the acting force of the torsion spring 29 tends to close the second valve body 27;

the second control device comprises a flexible steel wire 30 connected with the second valve body 27;

the free end of the flexible steel wire 30 extends out of a top opening 18a of the box body 18 to the outer side of the annular top cover 17;

a pull ring 31 is arranged at the end part of the free end of the flexible steel wire 30;

therefore, the second valve body 27 can be pulled to be opened through the pull ring 31 and the flexible steel wire 30; and when the pull ring 31 is loosened, the second valve body 27 is automatically closed under the action of the torsion of the torsion spring 29.

The second water inlet system comprises a water storage pipe 32 arranged between the water storage tank inlet end 24 and a water outlet of the wash basin of the washroom;

the pipe diameter height and the installation height of the water storage pipe 32 correspond to those of the water storage tank 23;

a water storage pipe inlet end 33 is connected with the water outlet of the wash basin of the washroom through a hose, and a water storage pipe outlet end 34 is connected with the water storage tank inlet end 24 through a hose;

a plurality of overflow ports 20a with the height of about 2 mm are uniformly distributed in the top of the annular partition plate 20, so that when the water storage pipe 32 and the water storage tank 23 are full of water, waste water continuously discharged into the water storage pipe 32 and the water storage tank 23 from the wash basin flows into the water flushing tank 21 through the overflow ports 20a and is discharged into the toilet bowl 1 through the water outlet holes 22, and the toilet bowl 1 is automatically flushed; and therefore, along with high-frequency use of the wash basin, the toilet bowl 1 is frequently and automatically flushed with waste water in the wash basin, sewage traces and bacteria which are difficult to be really flushed and are difficult to observe by naked eyes during normal toilet flushing are thoroughly flushed, generation of peculiar smell of the toilet is completely eradicated, and the problem that the toilet needs to be manually flushed frequently is solved.

The water inlet system comprises a water inlet pipe 25 which is arranged at the rear end of the annular top cover 17 and integrally formed with the box body 18, and a water inlet pipe outlet end 25b points to the water storage cavity 5;

a water inlet valve 35 is installed at the water inlet pipe outlet end 25b and located in the water storage cavity 5;

a handle 36 is arranged on the water inlet valve 35;

the tail end of the handle 36 is fixedly connected with a floating ball 37;

a water inlet pipe inlet end 25a is connected with a water pipe through a hose;

therefore, when the water level in the water storage cavity 5 rises to a preset position, the floating ball 37 drives the free end of the handle 36 to rotate upwards, so that the water inlet valve 35 is closed; and when the water level in the water storage cavity 5 drops, the floating ball 37 without buoyancy support drives the free end of the handle 36 to rotate downwards under the action of self gravity of the floating ball 37, so that the water inlet valve 35 is opened, and tap water is injected into the water storage cavity 5.

The water valve is composed of a circular ring 10 and a valve body 11, the outer circumferential surface of the circular ring 10 is connected with the inner circumferential surface of the water flushing port 7 in a sealed and embedded mode, the valve body 11 is rotatably hinged to the top of the circular ring 10, a rubber sheet 12 is arranged on the valve body 11, and when the free end of the valve body 11 rotates downwards until the rubber sheet 12 of the valve body 11 is attached to the top surface of the circular ring 10, the water valve is closed;

the control device comprises a permanent magnet 38 embedded on the valve body 11, an electromagnet 39 arranged corresponding to the permanent magnet 38 and embedded on the circular ring 10, and a controller which is electrically connected with the electromagnet 39 and is used for controlling the on and off of a power supply of the electromagnet 39 and the intensity of the electrifying current of the electromagnet 39;

when the controller button is pressed, the electromagnet 39 is electrified;

when the electromagnet 39 is electrified, upward thrust is applied to the corresponding end of the permanent magnet 38, so that the free end of the valve body 11 is opened upwards;

the intensity of the electrifying current of the electromagnet 39 is in direct proportion to the pressure applied when the controller button is pressed;

therefore, the opening size of the valve body 11 can be controlled through the magnitude of the pressure applied to the controller button; and when the electromagnet 39 is powered off, the free end of the valve body 11 is closed downwards under the combined action of the self gravity of the valve body 11 and the attraction force of the permanent magnet 38 to the magnetic core of the electromagnet 39.

The second water valve is composed of a second valve body 27 which is rotatably hinged to the water rinsing port 26, the rubber sheet 28 is arranged on the second valve body 27, and when the free end of the second valve body 27 rotates until the rubber sheet 28 of the second valve body 27 is attached to the matched surface 26a of the water rinsing port 26, the second water valve body is closed;

The second control device comprises a permanent magnet 40 embedded on the second valve body 27, an electromagnet 41 arranged corresponding to the permanent magnet 40 and fixedly connected to the bottom of the box body 18, and limiting rubber 42 arranged corresponding to the permanent magnet 40 and fixedly connected to the annular partition plate 20, and a second controller which is electrically connected with the electromagnet 41 and is used for controlling the on and off of a power supply of the electromagnet 41;

when the second controller button is pressed, the electromagnet 41 is electrified;

when the electromagnet 41 is electrified, thrust is applied to the tail end of the permanent magnet 40, so that the tail end of the permanent magnet 40 rotates to be tightly attached to the limiting rubber 42, and the second valve body 27 is opened;

when the electromagnet 41 is powered off, the attraction force between the free end of the permanent magnet 40 attached to the limiting rubber 42 and the magnetic core of the electromagnet 41 can drive the second valve body 27 to complete a gradually accelerated closing process within preset time; and therefore, after the electromagnet 41 is powered off, the toilet bowl 1 can be continuously flushed for a certain period of time, so that the time for pressing the second controller button is shortened.

The tops of the left side wall and the right side wall of the toilet body 2 are respectively located on the outer side of the top of the toilet bowl 1 by about 7 cm so that the widths of the two sides of the annular top cover 17 are similar to those of the two sides of a squatting pan, and therefore the sitting posture or the squatting posture can be freely selected according to personal preference;
   an integrally formed top plate 8 is arranged between the front end of the top of the toilet body 2 and the front end of the top of the toilet bowl 1; and
   a reinforcing rib plate 9 is arranged between the toilet bowl 1 and the toilet bottom 3.

Technical Effects of the Present Disclosure

Beneficial Effects

Compared with the prior art, the present disclosure has the following beneficial effects.

Firstly, as a large amount of excrement and more waste paper which are tightly adhered to a pool wall need to be flushed away at the same time, in order to prevent blockage, the inner diameter of a trap needs to be larger, especially the cross section of a water seal is larger, and therefore when the water flushing amount of an existing direct flushing type toilet is not large enough, sewage can be turned in the water seal, and an existing siphon type toilet cannot be siphoned when the water flushing amount is not large enough.

A sewage receiving area 6, which is inclined and is specially arranged for changing a sewage falling speed and direction, is provided on a side, corresponding to a sewage falling direction, of the upper end of a trap 4 and in an area with a certain height, so that the sewage receiving area 6 is provided with a proper longitudinal space for receiving sewage, and the preset speed direction of the sewage is changed at the position.

When small excrement is discharged, the water valve is opened slightly in front of the small excrement falling into the sewage receiving area 6 through the control device, so that the water storage cavity 5 flushes small-flow water into the sewage receiving area 6 through the water flushing port 7, and then the small excrement can slide into a water seal under the combined action of kinetic energy of the excrement, timely cooperation between small-flow flushing water flow blocking and flushing, and optimal guidance of the sewage receiving area 6 to the speed and direction of falling sewage, thereby preventing sewage splashing and odor emission; sewage traces left at the sewage receiving area 6 are also quickly flushed with small-flow flushing water, thereby preventing sewage attachment and odor emission.

When large excrement is discharged, the water valve is opened obviously in front of the large excrement falling into the sewage receiving area 6 through the control device, so that the water storage cavity 5 flushes large-flow water into the sewage receiving area 6 through the water flushing port 7, and then the large excrement can be discharged towards an outlet of the trap 4 under the combined action of kinetic energy of the excrement, timely cooperation between large-flow flushing water flow blocking and flushing, and optimal guidance of the sewage receiving area 6 to the speed and direction of falling sewage, so that sewage can be flushed away immediately with a small amount of flushing water, thereby saving on water and preventing sewage splashing and odor emission.

Therefore, according to the technical solution provided by the present disclosure, the phenomena of retention and blockage do not occur, so that the inner diameter of the trap 4 can be greatly smaller than that of an existing toilet, and the caliber at the water sealing surface of the trap 4 is larger than that of the existing toilet, and the amount of flushing water required for flushing away excrement is greatly reduced.

Secondly, a water storage cavity 5 is formed among the toilet body 2, the toilet bowl 1 and the toilet bottom 3 to replace a toilet water tank above the rear part of an existing toilet with a water tank, so that the length of the toilet is reduced by about 21 cm, the height of the toilet is reduced by about 36 cm, and more space is vacated for the washroom while the size of the toilet is greatly reduced.

Compared with an existing toilet without a water tank, although the size of the existing toilet without a water tank is equivalent, the problem that the existing toilet without a water tank has high requirement on the water pressure of tap water is solved.

Thirdly, a water flushing channel of the existing toilet is relatively long and narrow, and water flow extrudes air retained in the long and narrow channel during water flushing, so that sonic boom is generated.

A water flushing port 7 is provided in the upper end of the sewage receiving area 6, the sewage receiving area 6 is specially and intensively flushed, and the water flushing port 7 is directly in communication with the water storage cavity 5. Therefore, water flushing noise is rarely generated.

The sewage receiving area 6 has a special radial size, has strong convergence to flushing water flow, and can be flushed in a concentrated manner with an extremely small amount of flushing water.

Fourthly, one side of the bottom, corresponding to the bottom of a sewage sliding track, of the trap 4, including the sewage receiving area 6, is integrally in a streamlined design.

When sewage slides into the water seal along the sewage receiving area 6 and then is discharged to a water outlet in the tail end of the trap 4, the moving track is a smooth and streamlined moving track, so that the sewage can be flushed away with a small amount of flushing water.

Fifthly, a matched annular top cover 17 is buckled above the top of the toilet body 2 and the top of the toilet bowl 1.

The annular top cover 17 is of a hollow box type structure and is composed of a box body 18 and a box cover 19 buckled with the box body 18.

A circle of annular partition plate 20 is arranged in the box body 18 and divides the box body 18 into two areas such as a water flushing tank 21 and a water storage tank 23.

The second water inlet system comprises a water storage pipe 32 arranged between the water storage tank inlet end 24 and a water outlet of the wash basin of the washroom. The pipe diameter height and the installation height of the water storage pipe 32 correspond to those of the water storage tank 23.

A water storage pipe inlet end 33 is connected with the water outlet of the wash basin of the washroom through a hose, and a water storage pipe outlet end 34 is connected with the water storage tank inlet end 24 through a hose.

Thus, a large amount of waste water in the wash basin is stored in the water storage pipe 32 and the water storage tank 23 for toilet flushing, so that a large amount of water resources are saved.

Sixthly, a plurality of overflow ports 20a with the height of about 2 mm are uniformly distributed in the top of the annular partition plate 20.

Thus, when the water storage pipe 32 and the water storage tank 23 are full of water, waste water continuously discharged into the water storage pipe 32 and the water storage tank 23 from the wash basin flows into the water flushing tank 21 through the overflow ports 20a and is discharged into the toilet bowl 1 through the water outlet holes 22, and the toilet bowl 1 is automatically flushed.

Therefore, along with high-frequency use of the wash basin, the toilet bowl 1 is frequently and automatically flushed with waste water in the wash basin, sewage traces and bacteria which are difficult to be really flushed and are difficult to observe by naked eyes during normal toilet flushing are thoroughly flushed, generation of peculiar smell of the toilet is completely eradicated, and the problem that the toilet needs to be manually flushed frequently is solved.

Seventhly, the sitting posture and the squatting posture can be adopted, and meanwhile the using habits of different crowds are considered.

Figure 1:
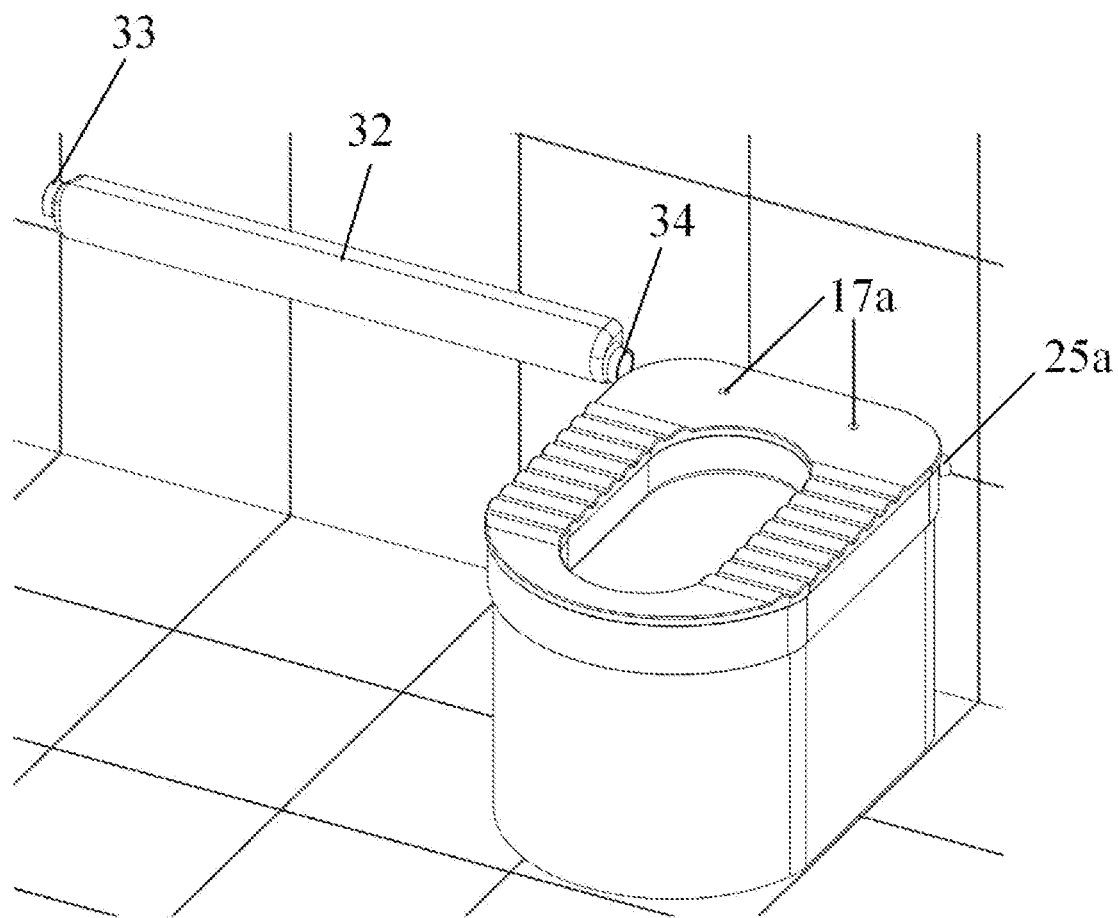
FIG. 1 is an overall structural schematic diagram of the first embodiment.
Figure 2:
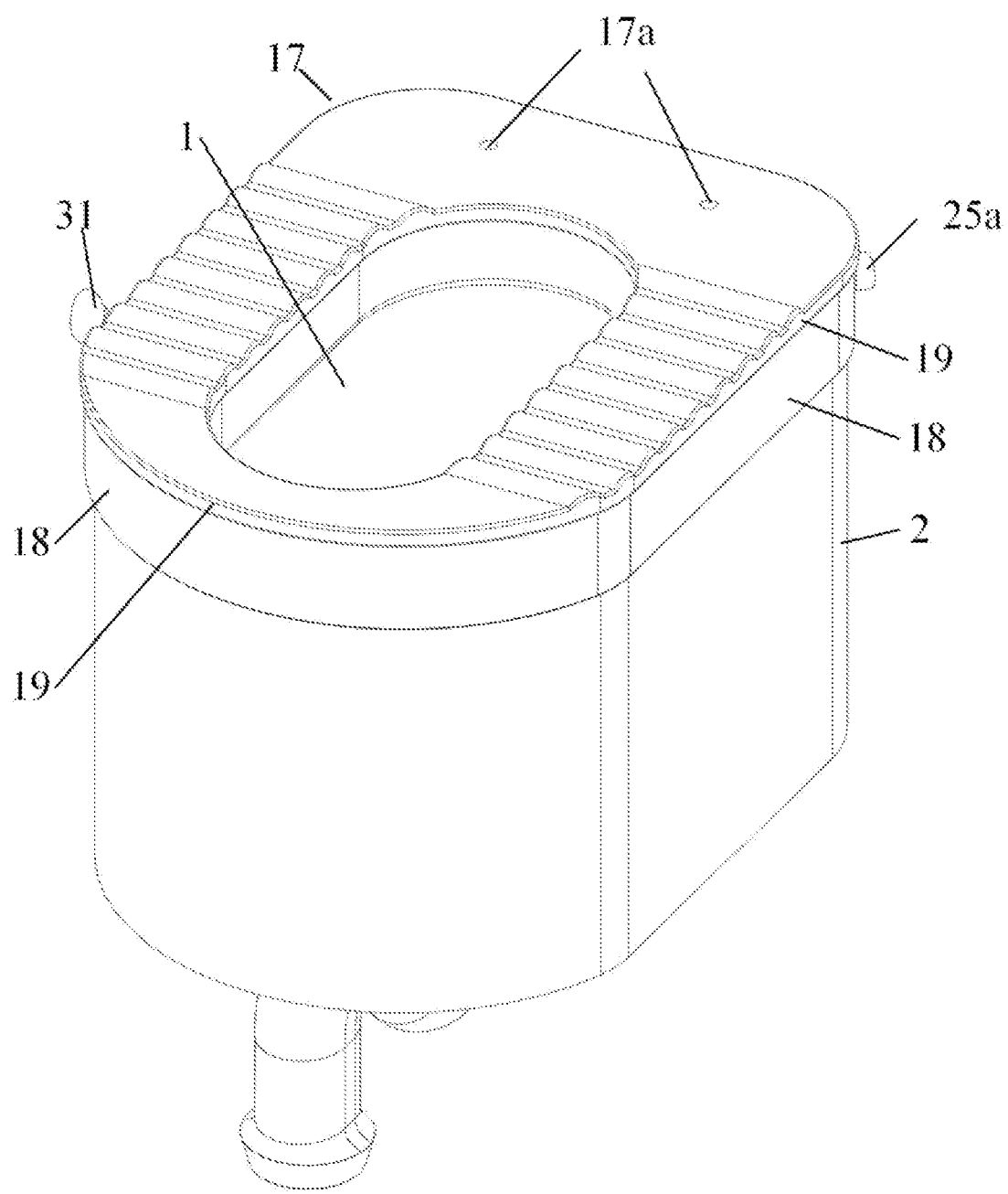
FIG. 2 is a structural schematic diagram of the fourth embodiment.
Figure 3:
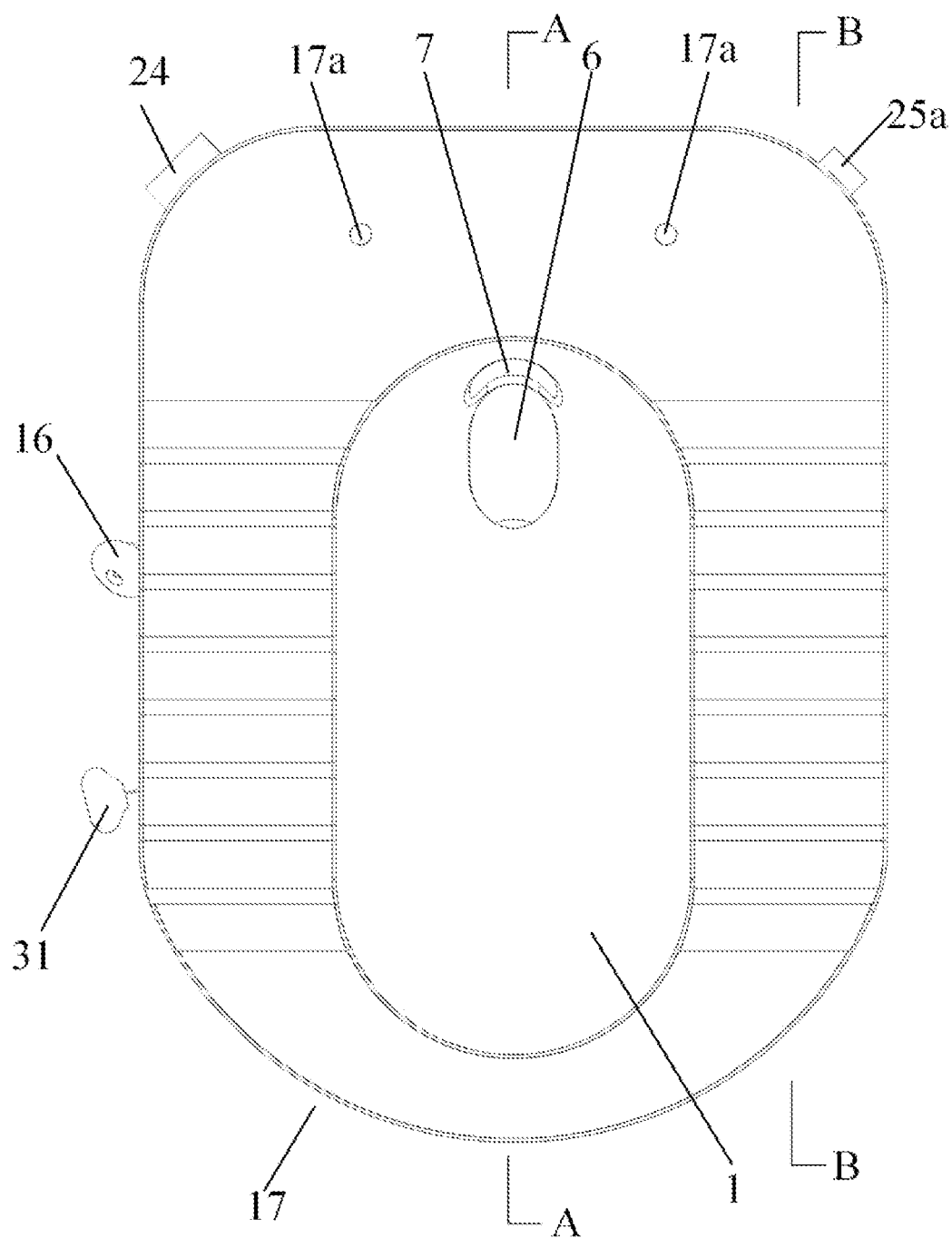
FIG. 3 is a top view of FIG. 2.
Figure 4:
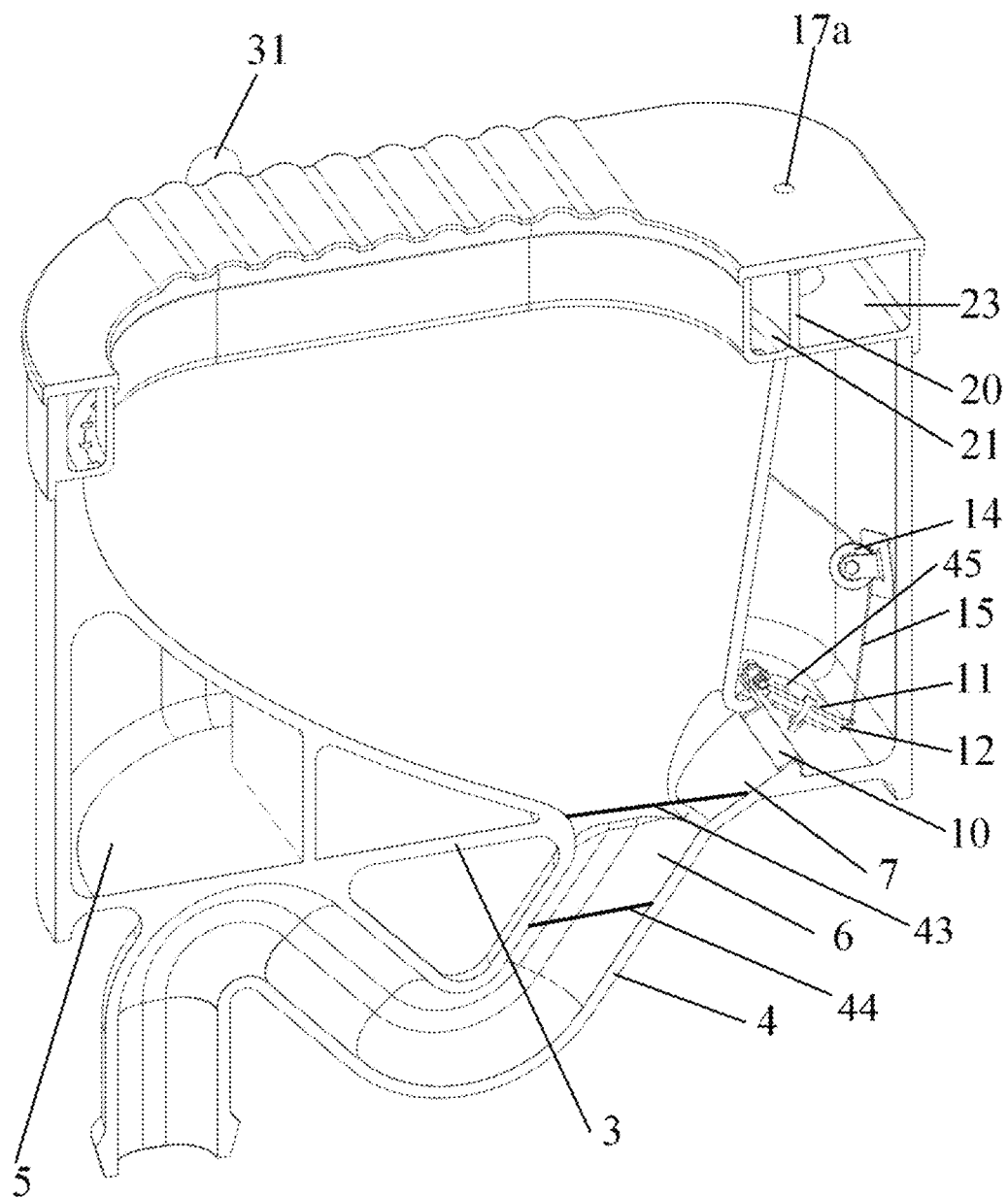
FIG. 4 is an A-A section view of FIG. 3.
Figure 5:
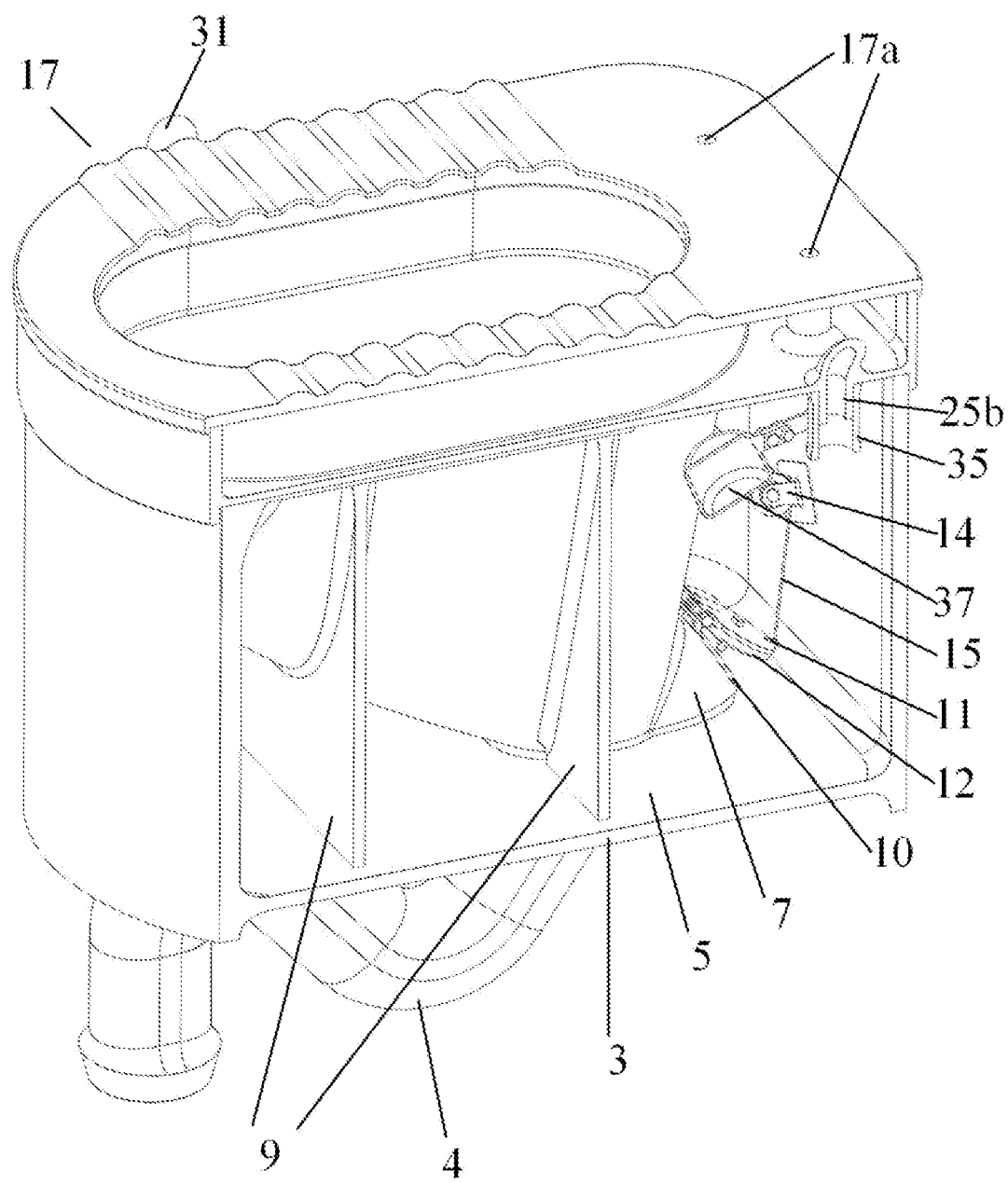
FIG. 5 is a B-B section view of FIG. 3.
Figure 6:
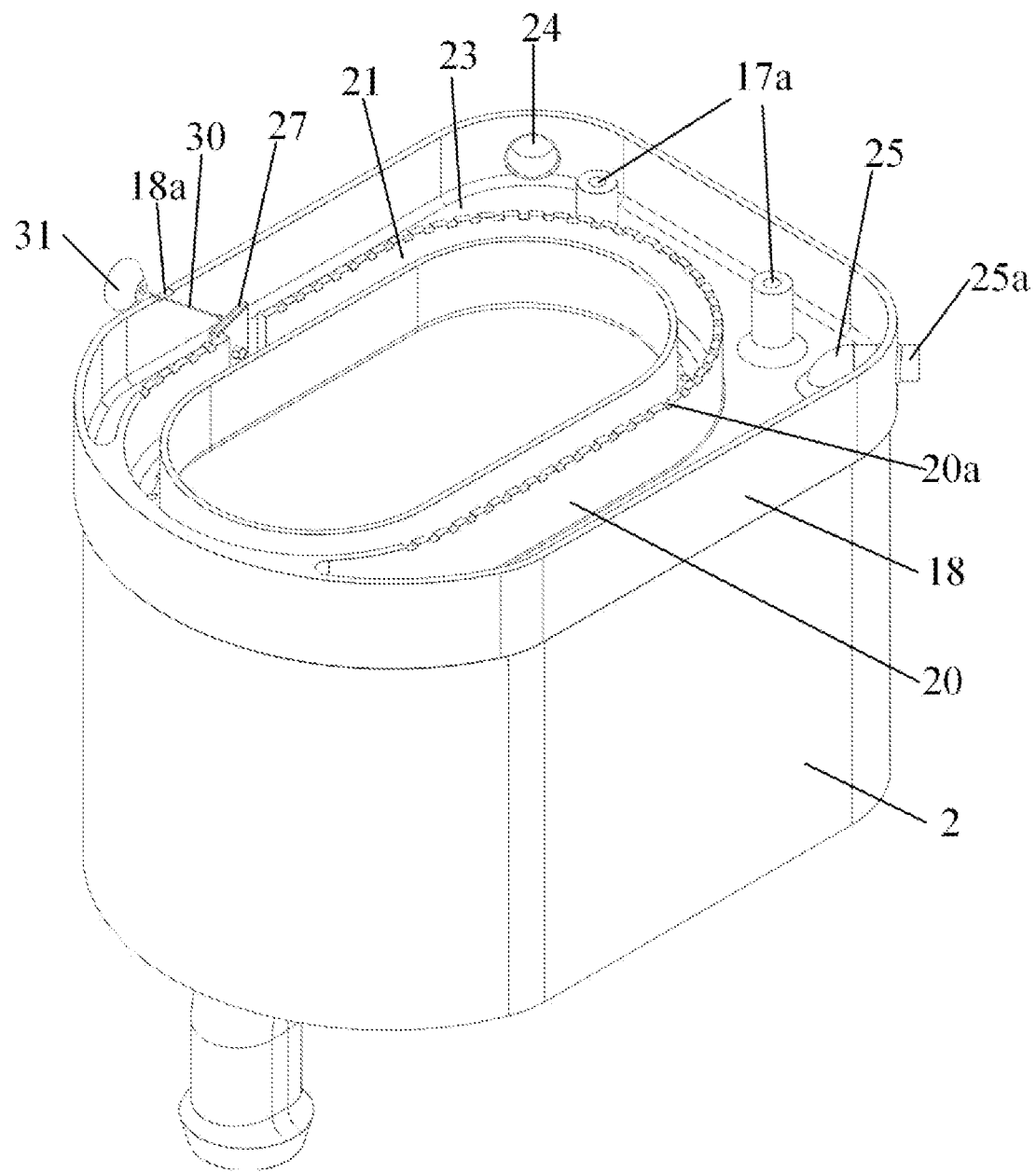
FIG. 6 is a structural schematic diagram when a box cover 19 is omitted in FIG. 2.
Figure 7:
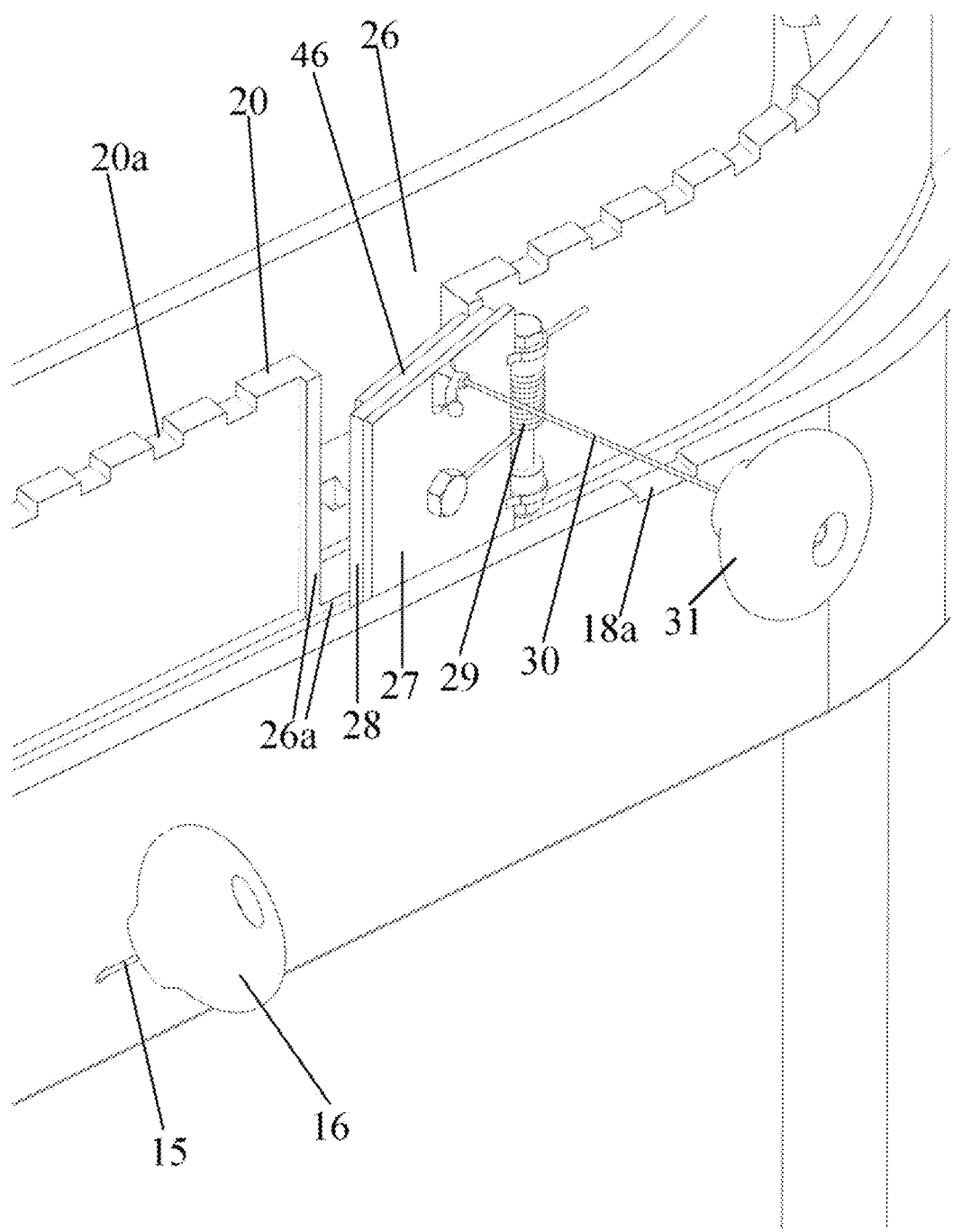
FIG. 7 is a partial enlarged drawing at a second water valve in FIG. 6.
Figure 8:
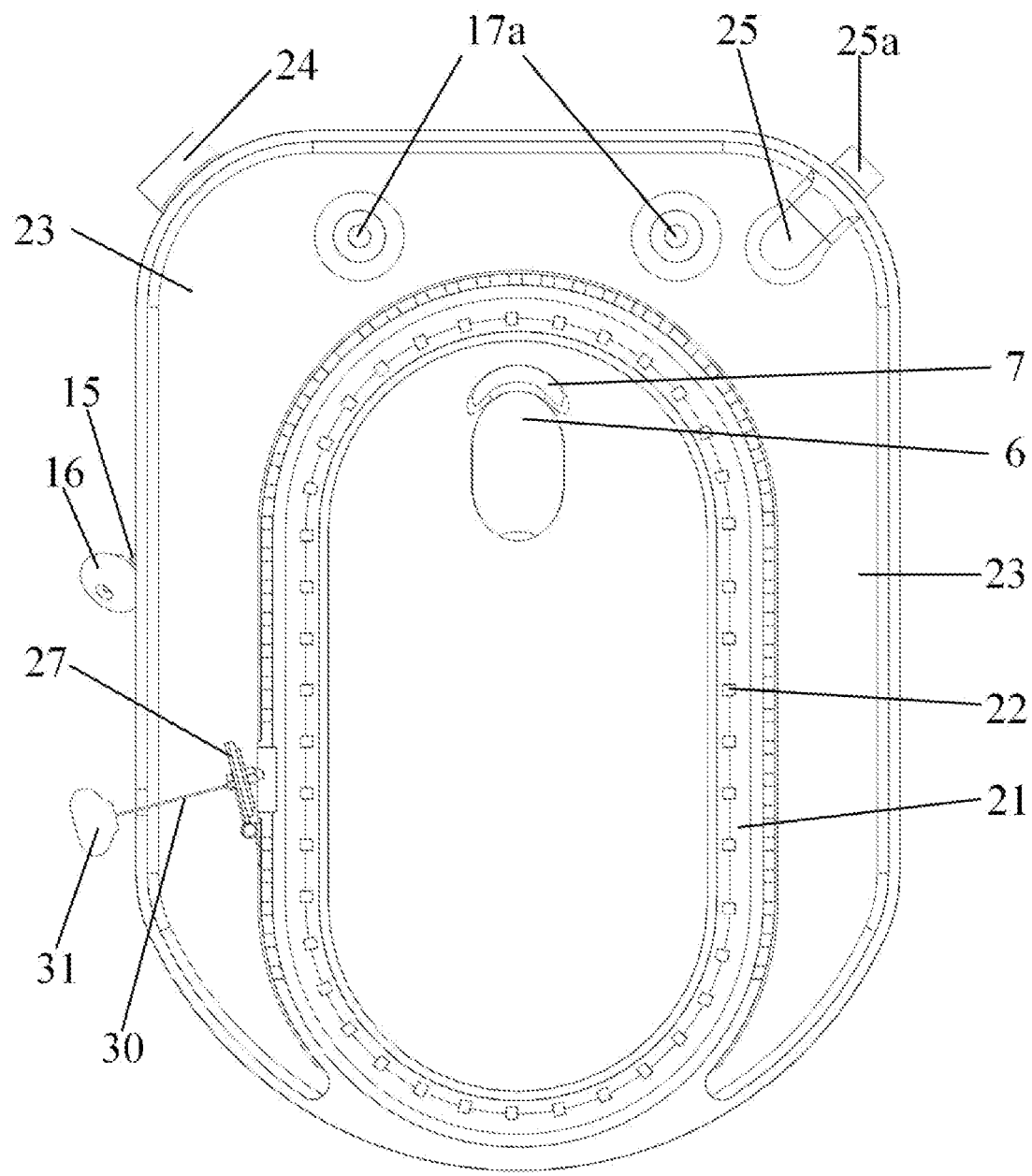
FIG. 8 is a top view of FIG. 6.
Figure 9:
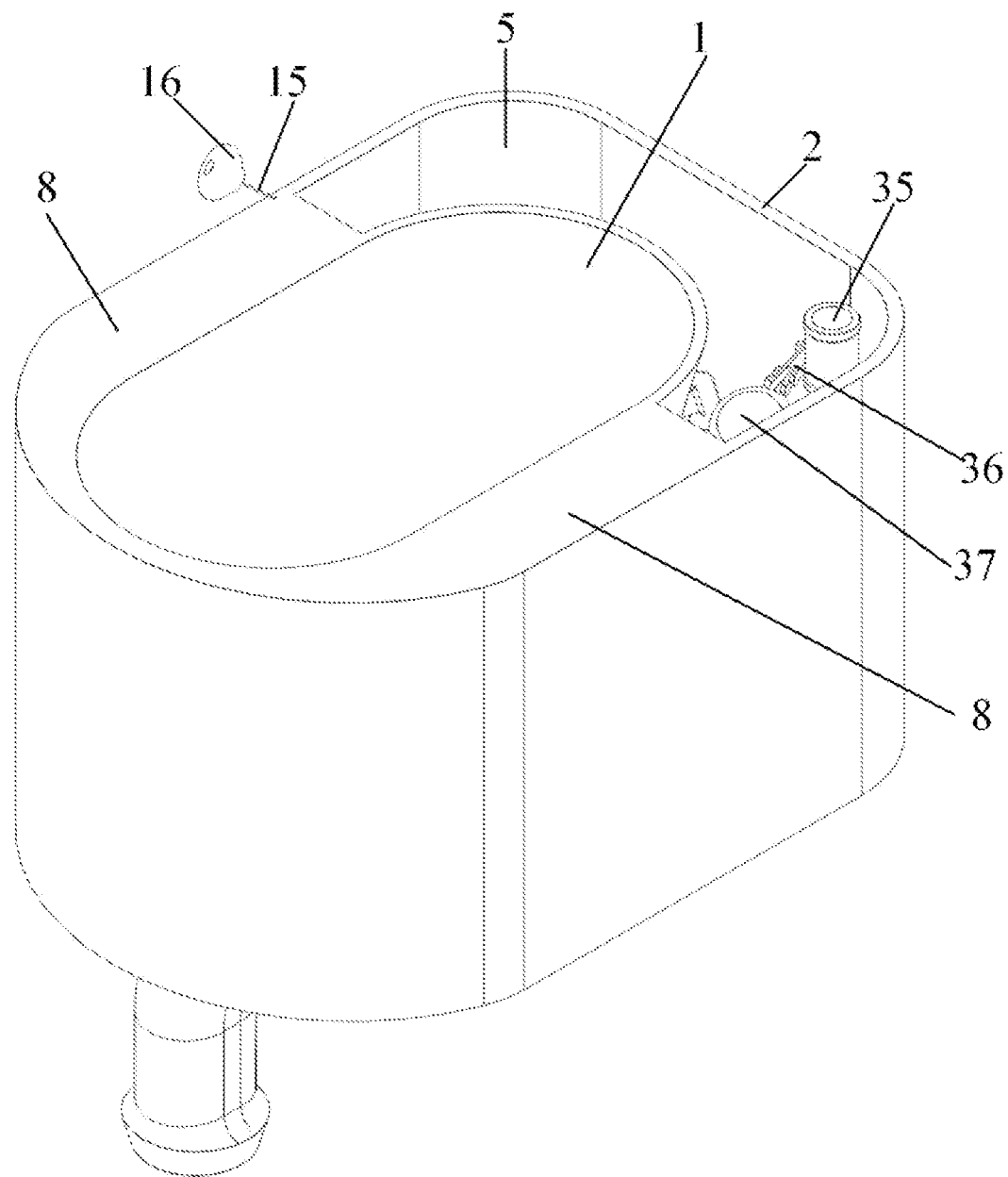
FIG. 9 is a structural schematic diagram when partial structures are omitted in FIG. 6.
Figure 10:
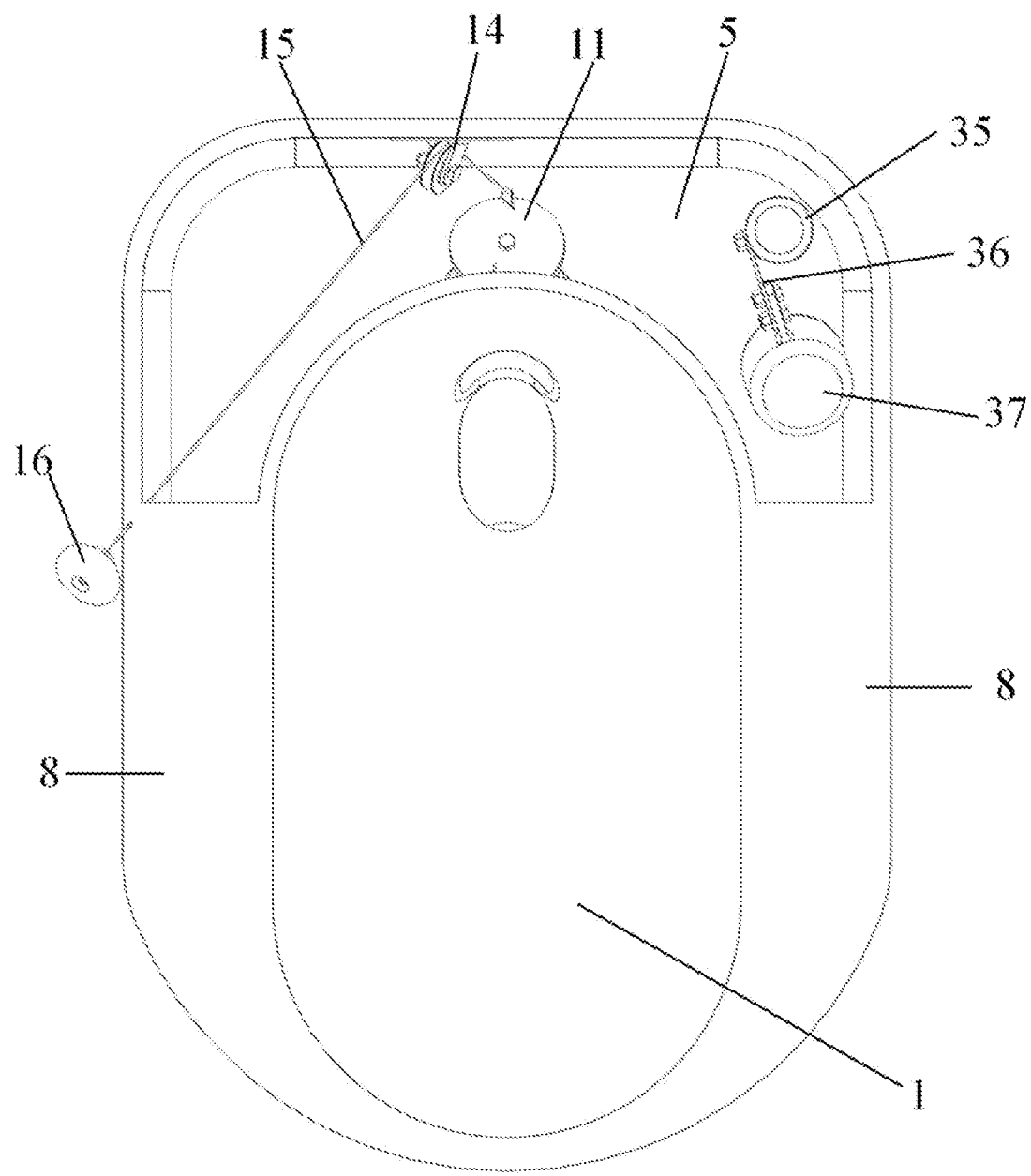
FIG. 10 is a top view of FIG. 9.
Figure 11:
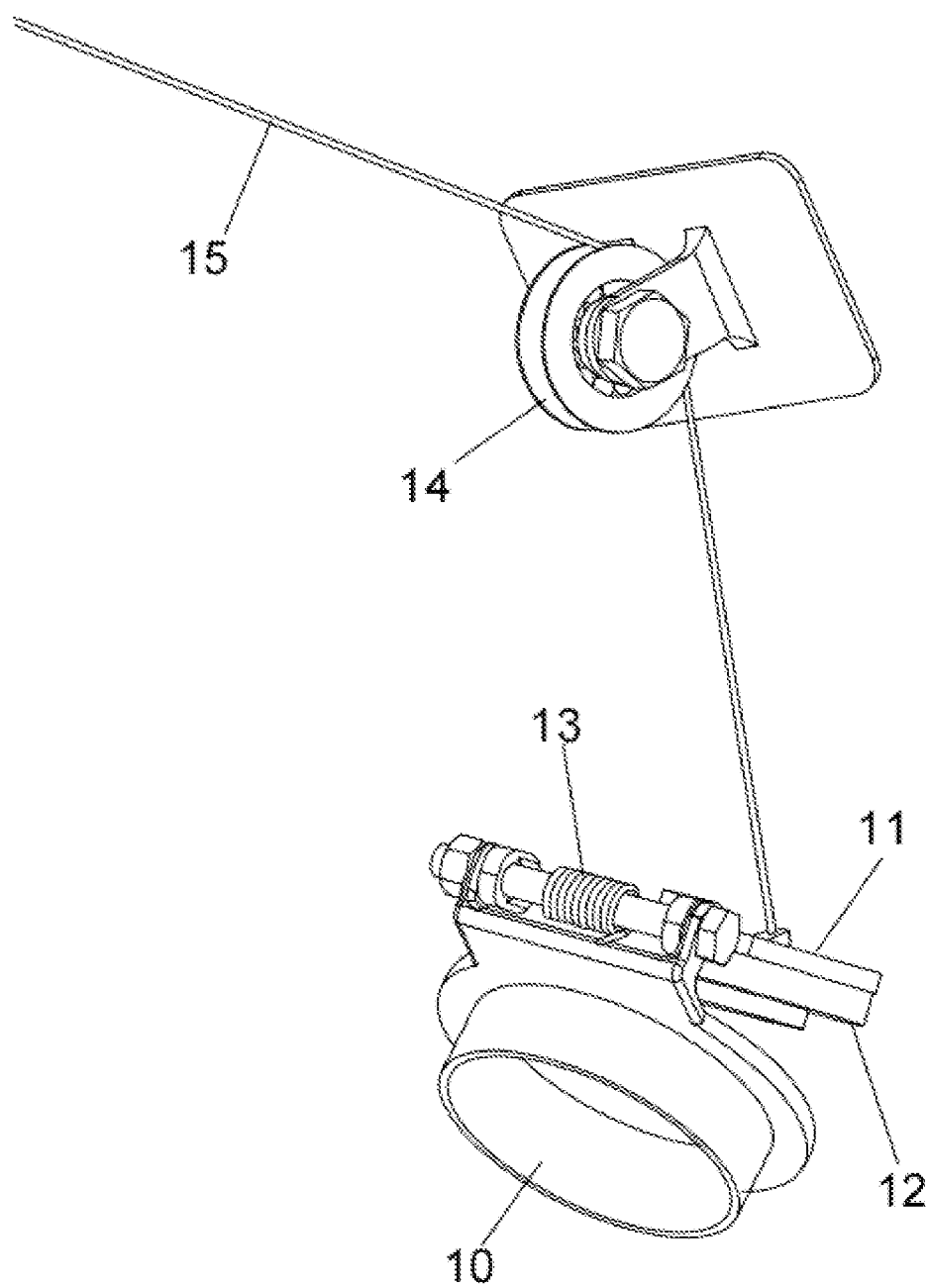
FIG. 11 and FIG. 12 are structural schematic diagrams of a water valve and a water valve control device in the fourth embodiment.
Figure 12:
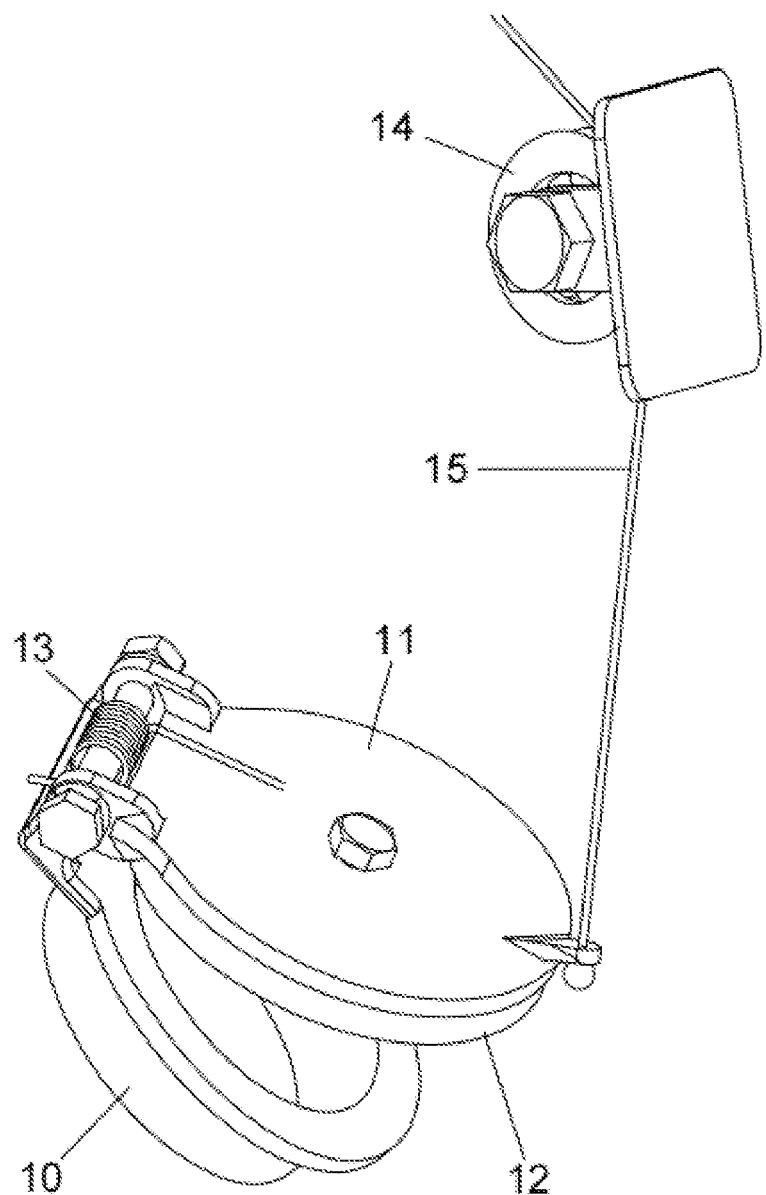
Figure 13:
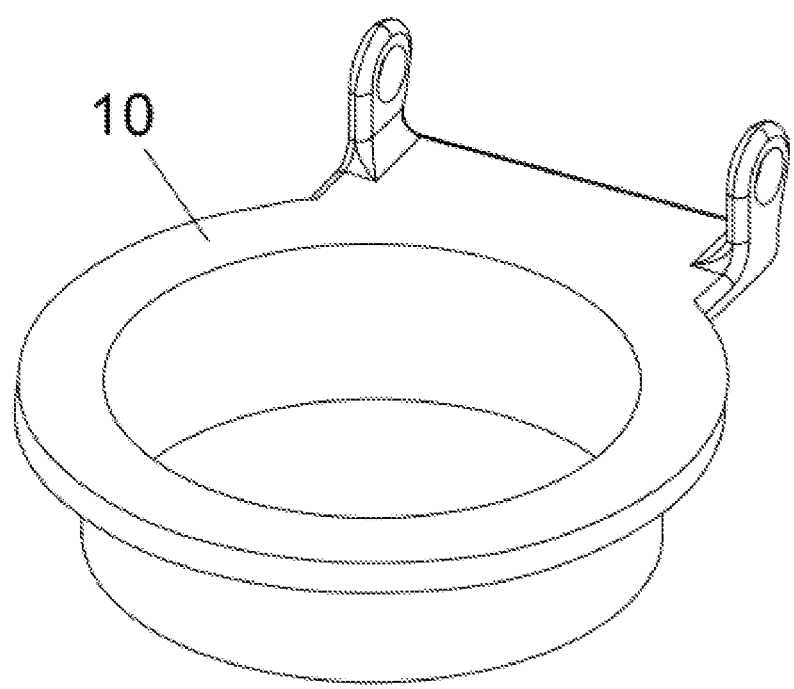
FIG. 13 is a structural schematic diagram of a circular ring 10 in the fourth embodiment.
Figure 14:
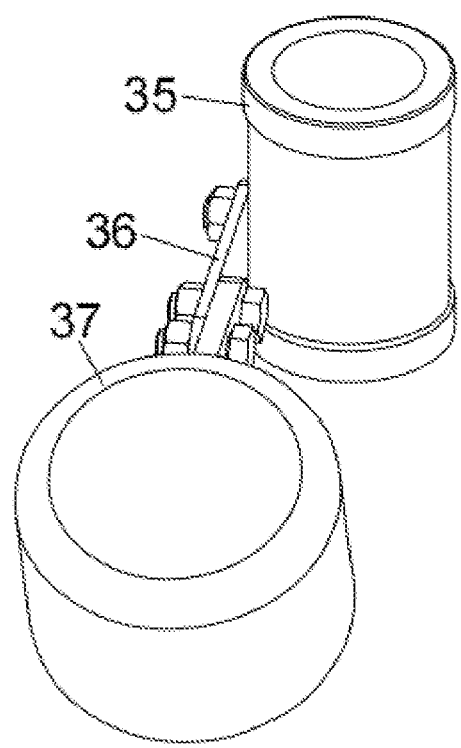
FIG. 14 is a structural schematic diagram of a water inlet valve 35 and a floating ball 37 in the fourth embodiment.
Figure 15:
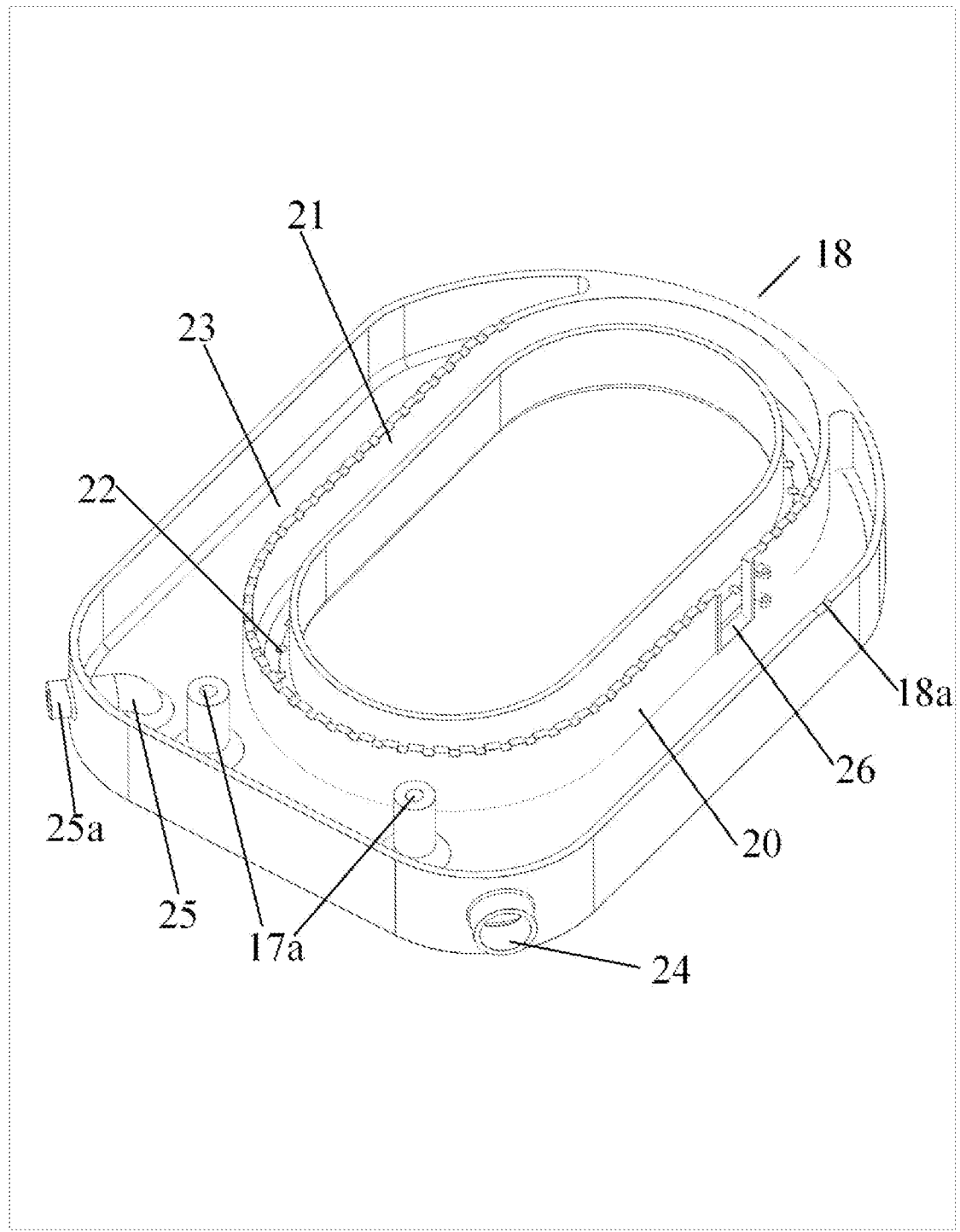
FIG. 15 is a structural schematic diagram of a box body 18 in FIG. 6.
Figure 16:
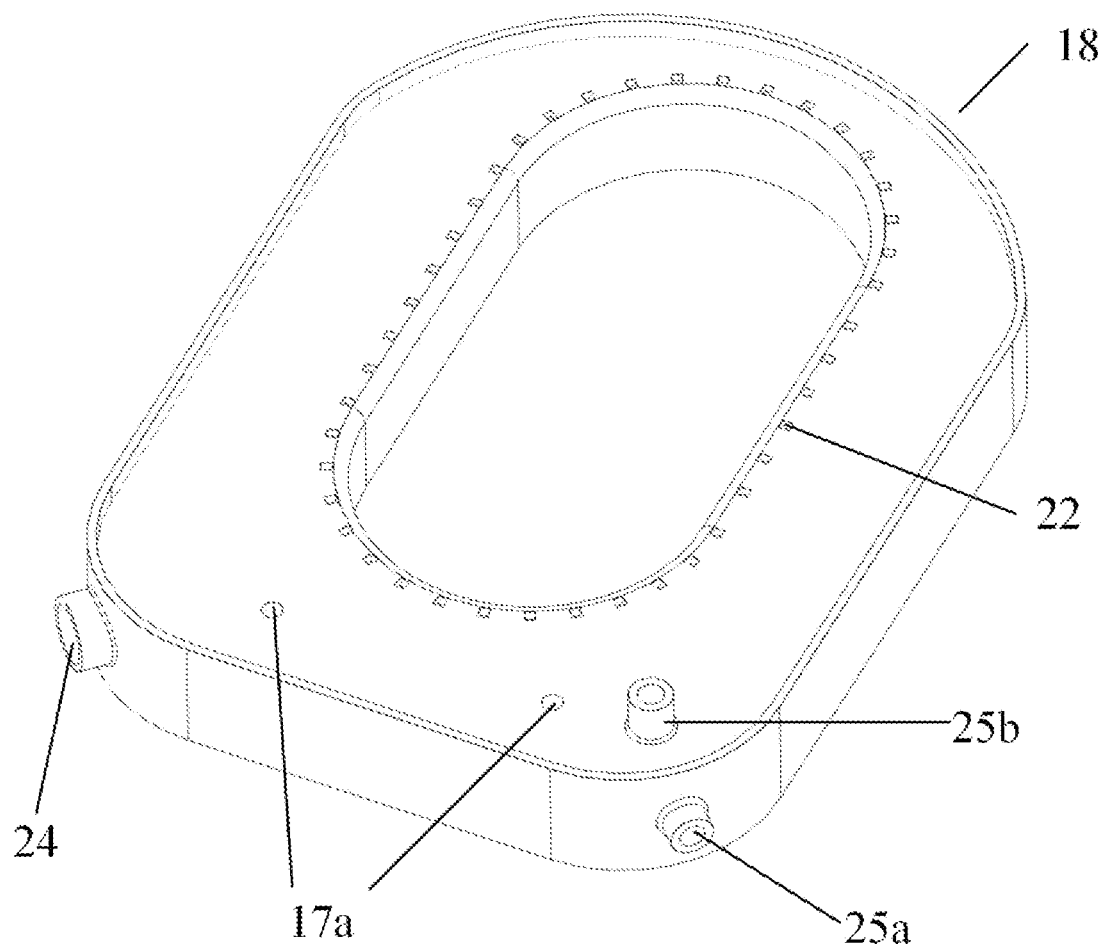
FIG. 16 is a rear view of a box body 18 in FIG. 15.
Figure 17:
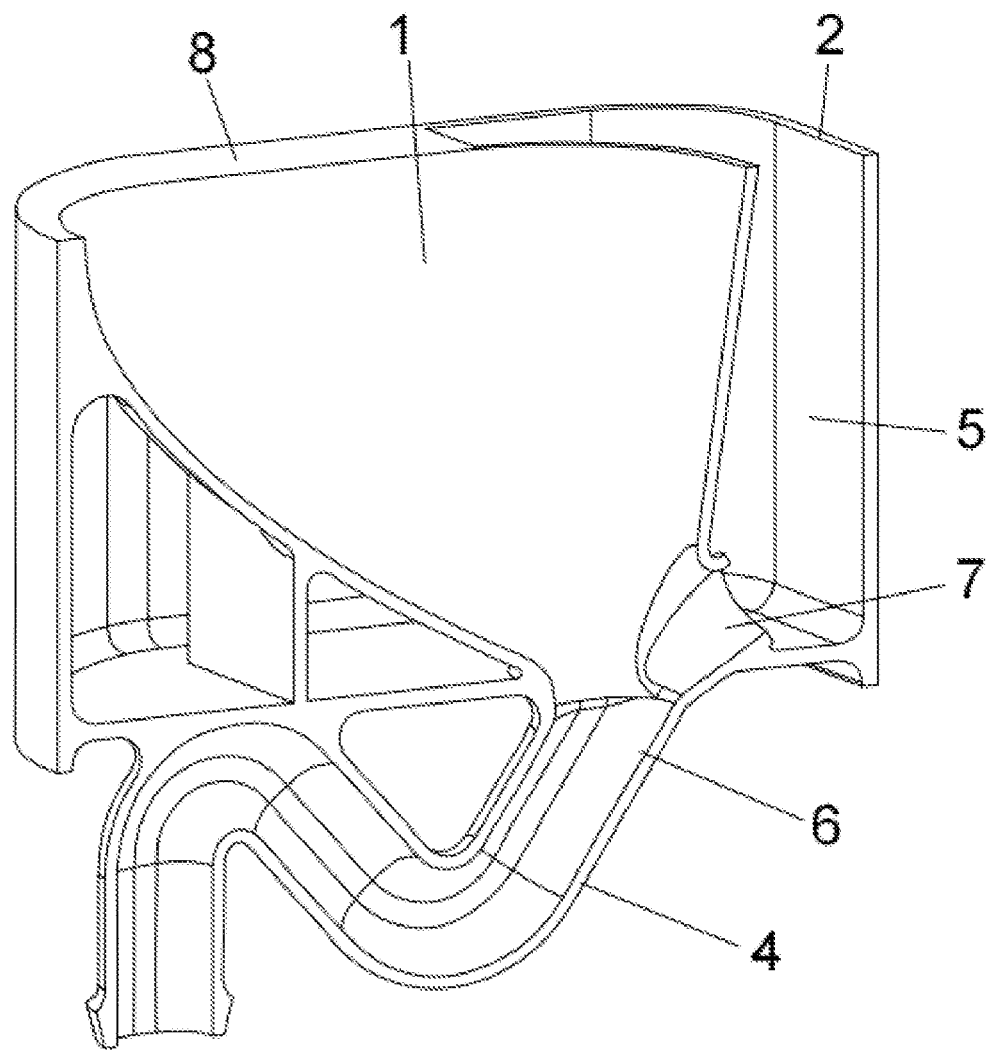
FIG. 17 is a section-view structural schematic diagram when partial structures are omitted in FIG. 9.

Reference signs in the attached figures: 1, toilet bowl; 2, toilet body; 3, toilet bottom; 4, trap; 5, water storage cavity; 6, sewage receiving area; 7, water flushing port; 8, top plate; 9, reinforcing rib plate; 10, circular ring; 11, valve; 12, rubber sheet; 13, torsion spring; 14, fixed pulley; 15, flexible steel wire; 16, pull ring; 17, annular top cover; 17*a*, toilet cover installing hole; 18, box body; 18*a*, top opening of box body; 19, box cover; 20, annular partition plate; 20*a*, overflow port; 21, water flushing tank; 22, water outlet hole; 23, water storage tank; 24, water storage tank inlet end; 25, water inlet pipe; 25*a*, water inlet pipe inlet end; 25*b*, water inlet pipe outlet end; 26, water rinsing port; 26*a*, matched surface of water rinsing port 26; 27, second valve body; 28, rubber sheet; 29, torsion spring; 30, flexible steel wire; 31, pull ring; 32, water storage pipe; 33, water storage pipe inlet end; 34, water storage pipe outlet end; 35, water inlet valve; 36, handle; 37, floating ball; 38, permanent magnet; 39, electromagnet; 40, permanent magnet; 41, electromagnet; 42, limiting rubber; 43, horizontal cross-sectional area of an aperture of a top end of a trap; 44, water sealing surface; 45, first water valve; and 46, second water valve.

DETAILED DESCRIPTION OF THE EMBODIMENTS

Embodiment I

Referring to FIG. 1 to FIG. 17, a flushing method for a toilet is provided. The toilet comprises a toilet bowl 1, a toilet body 2 and a toilet bottom 3 integrally formed with the toilet bowl 1 and the toilet body 2, and a toilet bowl 1 is provided at the lower end thereof with a trap 4, wherein a sewage receiving area 6, which is inclined and is specially arranged for changing a sewage falling speed and direction, is provided on a side, corresponding to a sewage falling direction, of the upper end of a trap 4 and in an area with a certain height;

a water sealing surface 44 of the trap 4 is located below the sewage receiving area 6, and a horizontal cross-sectional area 43 of the aperture of the top end of the trap 4 is slightly larger than the area of the water sealing surface 44;

a water flushing port 7 is provided in the upper end of the sewage receiving area 6;

a water storage cavity 5 is formed among the toilet body 2, the toilet bowl 1 and the toilet bottom 3;

the water flushing port 7 is in communication with the water storage cavity 5;

a first water valve 45 is arranged at an intake end of the water flushing port 7;

the toilet is also provided with a control device for controlling the opening and closing of the first water valve 45 and controlling the opening size of the first water valve 45;

in addition, the toilet is further provided with a water inlet system for injecting water into the water storage cavity 5;

therefore, when small excrement is discharged, the first water valve 45 is opened slightly in front of the small excrement falling into the sewage receiving area 6 through the control device, so that the water storage cavity 5 flushes small-flow water into the sewage receiving area 6 through the water flushing port 7, and then the small excrement can slide into a water seal under the combined action of kinetic energy of the excrement, timely cooperation between small-flow flushing water flow blocking and flushing, and optimal guidance of the sewage receiving area 6 to the speed and direction of falling sewage, thereby preventing sewage splashing and odor emission; sewage traces left at the sewage receiving area 6 are also quickly flushed with small-flow flushing water, thereby preventing sewage attachment and odor emission; and when large excrement is discharged, the first water valve 45 is opened obviously in front of the large excrement falling into the sewage receiving area 6 through the control device, so that the water storage cavity 5 flushes large-flow water into the sewage receiving area 6 through the water flushing port 7, and then the large excrement can be discharged towards an outlet of the trap 4 under the combined action of kinetic energy of the excrement, timely cooperation between large-flow flushing water flow blocking and flushing, and optimal guidance of the sewage receiving area 6 to the speed and direction of falling sewage, so that sewage can be flushed away immediately with a small amount of flushing water, thereby saving on water and preventing sewage splashing and odor emission.

One side of the bottom, corresponding to the bottom of a sewage sliding track, of the trap 4, including the sewage receiving area 6, is integrally in a streamlined design; and
  when sewage slides into the water seal along the sewage receiving area 6 and then is discharged to a water outlet in the tail end of the trap 4, the moving track is a smooth and streamlined moving track.

The bottom of the toilet body 2 is attached to the ground, the toilet bottom 3 is flush with the bottom of the toilet body 2 or slightly higher than the bottom of the toilet body 2, and the trap 4 is generally located below the toilet bottom 3;
  therefore, the distance between the water flushing port 7 and the hip and the distance between the sewage receiving area 6 and the hip are large enough, the kinetic energy generated when sewage makes contact with the sewage receiving area 6 is larger, and sewage can be flushed away with a smaller amount of flushing water; and
  therefore, the effective volume of the water storage cavity 5 can be greatly increased.

The first water valve 45 is composed of a circular ring 10 and a valve body 11, the outer circumferential surface of the circular ring 10 is connected with the inner circumferential surface of the water flushing port 7 in a sealed and embedded mode, the valve body 11 is rotatably hinged to the top of the circular ring 10, a rubber sheet 12 is arranged on the valve body 11, and when the free end of the valve body 11 rotates downwards until the rubber sheet 12 of the valve body 11 is attached to the top surface of the circular ring 10, the first water valve 45 is closed;
  a torsion spring 13 is connected between the valve body 11 and the circular ring 10, and the acting force of the torsion spring 13 tends to close the first water valve 45;
  the control device comprises a fixed pulley 14 arranged on the rear side wall of the toilet body 2 and a flexible steel wire 15 of which the lower end is connected with the free end of the valve body 11;
  the free end of the flexible steel wire 15 surrounds the fixed pulley 14 and extends out of the top of the right or left side wall of the toilet body 2 to the outer side of the toilet body 2;
  a pull ring 16 is arranged at the end part of the free end of the flexible steel wire 15;
  when the pull ring 16 is handheld and the free end of the valve body 11 is pulled to rotate upwards through the flexible steel wire 15 and the fixed pulley 14, the first water valve 45 is opened; and
  when the pull ring 16 is loosened, the free end of the valve body 11 rotates under the combined action of the self gravity of the valve body 11 and the torsion of the torsion spring 13 until the rubber sheet 12 of the valve body 11 is tightly attached to the top surface of the circular ring 10, and the first water valve 45 is closed.

A matched annular top cover 17 is buckled above the top of the toilet body 2 and the top of the toilet bowl 1;
  the whole inner ring of the annular top cover 17 extends into the inner side of the top of the toilet bowl 1 by about 2 cm;
  the annular top cover 17 is of a hollow box type structure and is composed of a box body 18 and a box cover 19 buckled with the box body 18;
  a circle of annular partition plate 20 is arranged in the box body 18 and divides the box body 18 into two areas such as a water flushing tank 21 and a water storage tank 23;
  a plurality of water outlet holes 22 are uniformly distributed in the inner side of the bottom of the water flushing tank 21, and the water outlet holes 22 respectively correspond to the inner side of the top of the toilet bowl 1;
  a water rinsing port 26 is formed between the water flushing tank 21 and the water storage tank 23, and a second water valve 46 is arranged at the water rinsing port 26;
  in addition, the toilet is further provided with a second control device for controlling the opening and closing of the second water valve 46; and
  moreover, the toilet is further provided with a second water inlet system for supplying water for the water storage tank 23, and a water storage tank inlet end 24 is connected with the second water inlet system.

The second water valve 46 is composed of a second valve body 27 which is rotatably hinged to the water rinsing port 26, the rubber sheet 28 is arranged on the second valve body 27, and when the free end of the second valve body 27 rotates until the rubber sheet 28 of the second valve body 27 is attached to the matched surface 26a of the water rinsing port 26, the second water valve body 46 is closed;
  a torsion spring 29 is connected between the second valve body 11 and the annular partition plate 10, and the acting force of the torsion spring 29 tends to close the second valve body 27;
  the second control device comprises a flexible steel wire 30 connected with the second valve body 27;
  the free end of the flexible steel wire 30 extends out of a top opening 18a of the box body 18 to the outer side of the annular top cover 17;
  a pull ring 31 is arranged at the end part of the free end of the flexible steel wire 30;
  therefore, the second valve body 27 can be pulled to be opened through the pull ring 31 and the flexible steel wire 30; and
  when the pull ring 31 is loosened, the second valve body 27 is automatically closed under the action of the torsion of the torsion spring 29.

The second water inlet system comprises a water storage pipe 32 arranged between the water storage tank inlet end 24 and a water outlet of the wash basin of the washroom;
  the pipe diameter height and the installation height of the water storage pipe 32 correspond to those of the water storage tank 23;
  a water storage pipe inlet end 33 is connected with the water outlet of the wash basin of the washroom through a hose, and a water storage pipe outlet end 34 is connected with the water storage tank inlet end 24 through a hose;
  a plurality of overflow ports 20a with the height of about 2 mm are uniformly distributed in the top of the annular partition plate 20, so that when the water storage pipe 32 and the water storage tank 23 are full of water, waste water continuously discharged into the water storage pipe 32 and the water storage tank 23 from the wash basin flows into the water flushing tank 21 through the overflow ports 20a and is discharged into the toilet bowl 1 through the water outlet holes 22, and the toilet bowl 1 is automatically flushed; and
  therefore, along with high-frequency use of the wash basin, the toilet bowl 1 is frequently and automatically flushed with waste water in the wash basin, sewage traces and bacteria which are difficult to be really flushed and are difficult to observe by naked eyes during normal toilet flushing are thoroughly flushed, generation of peculiar smell of the toilet is completely eradicated, and the problem that the toilet needs to be manually flushed frequently is solved.

The water inlet system comprises a water inlet pipe 25 which is arranged at the rear end of the annular top cover 17 and integrally formed with the box body 18, and a water inlet pipe outlet end 25b points to the water storage cavity 5;

a water inlet valve 35 is installed at the water inlet pipe outlet end 25b and located in the water storage cavity 5;

a handle 36 is arranged on the water inlet valve 35;

the tail end of the handle 36 is fixedly connected with a floating ball 37;

a water inlet pipe inlet end 25a is connected with a water pipe through a hose;

therefore, when the water level in the water storage cavity 5 rises to a preset position, the floating ball 37 drives the free end of the handle 36 to rotate upwards, so that the water inlet valve 35 is closed; and when the water level in the water storage cavity 5 drops, the floating ball 37 without buoyancy support drives the free end of the handle 36 to rotate downwards under the action of self gravity of the floating ball 37, so that the water inlet valve 35 is opened, and tap water is injected into the water storage cavity 5.

Embodiment II

Figure 18:
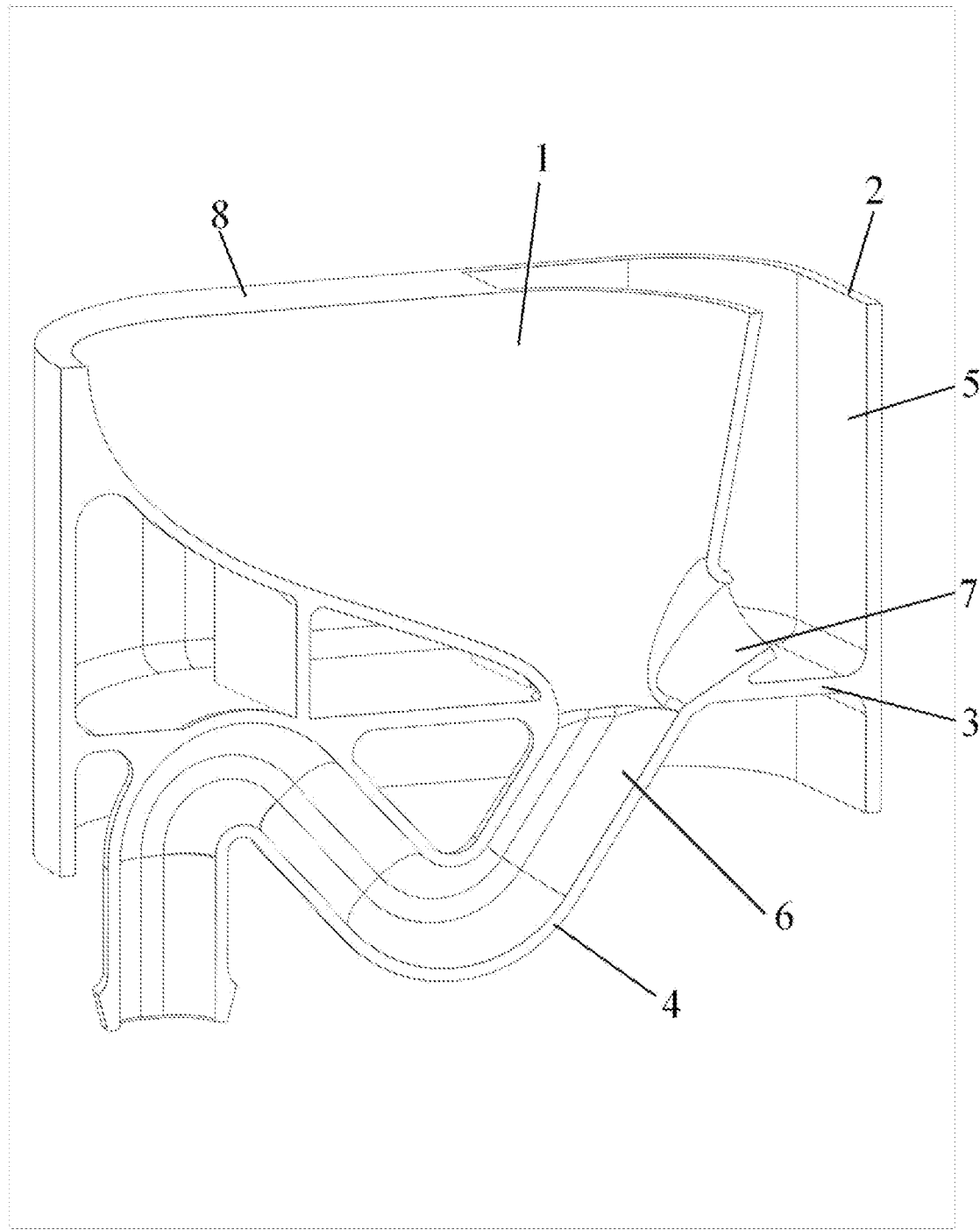
FIG. 18 is a section-view structural schematic diagram of the fifth embodiment.

Referring to FIG. 18, the difference between the second embodiment and the first embodiment lies in that, in the first embodiment, the toilet bottom 3 is flush with or slightly higher than the bottom of the toilet body 2 (the bottom of the toilet body 2 is attached to the ground); in the second embodiment, the toilet bottom 3 is about 5-13 cm higher than the bottom (ground) of the toilet body 2; and the lowest point of the trap 4 is lower than the bottom (ground) of the toilet body 2 by a certain distance, or the trap 4 and the toilet body 2 are approximately flush.

Embodiment III

Figure 19:
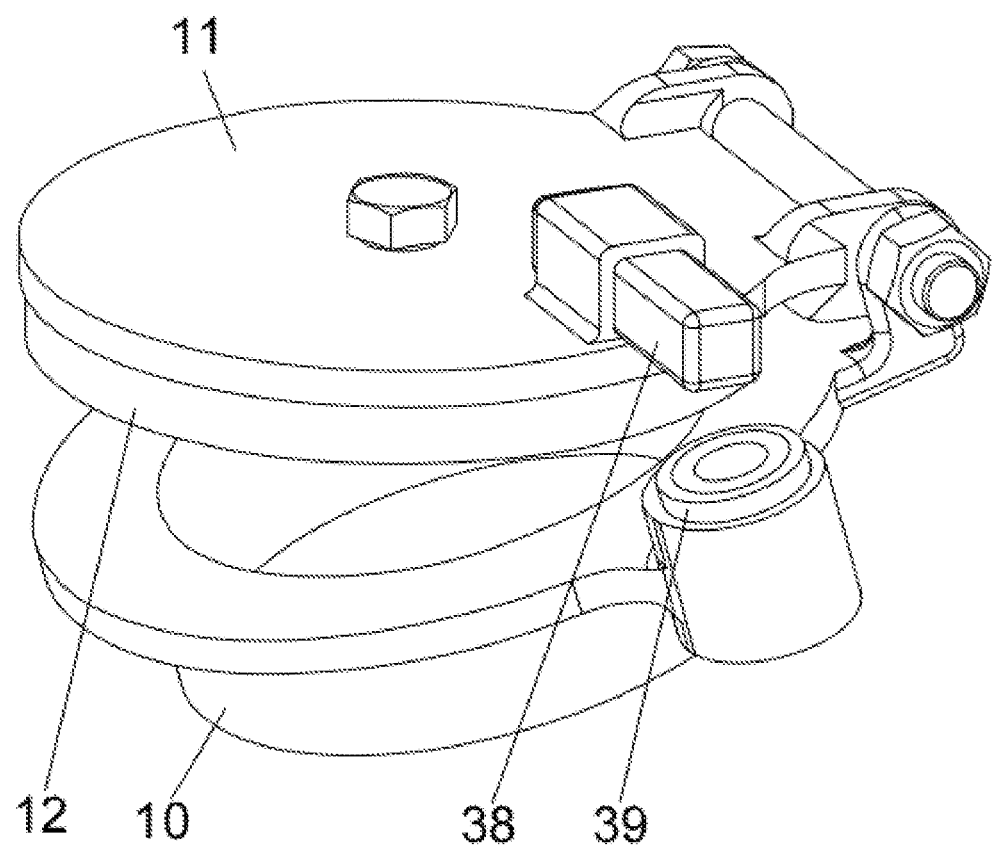
FIG. 19 is a structural schematic diagram of a water valve and a water valve control device in the sixth embodiment.
Figure 20:
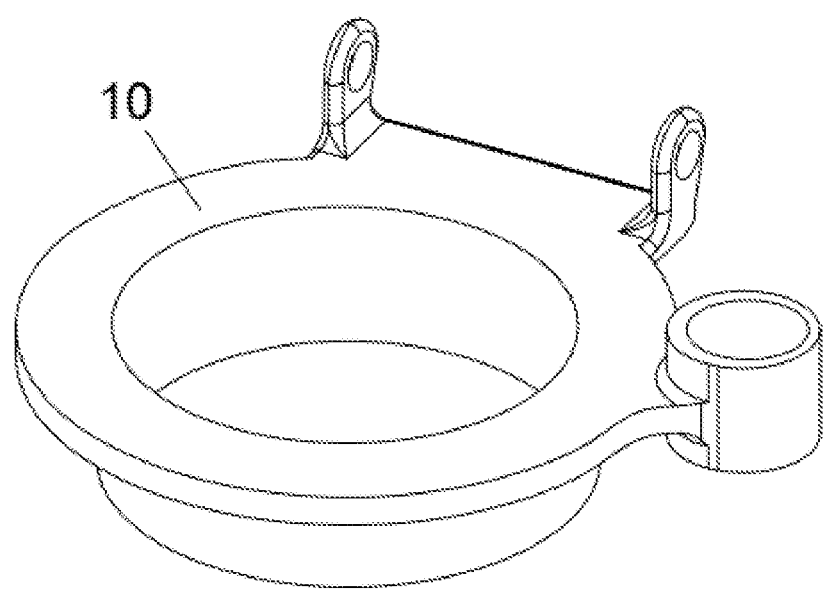
FIG. 20 is a structural schematic diagram of a circular ring 18 in FIG. 19.
Figure 21:
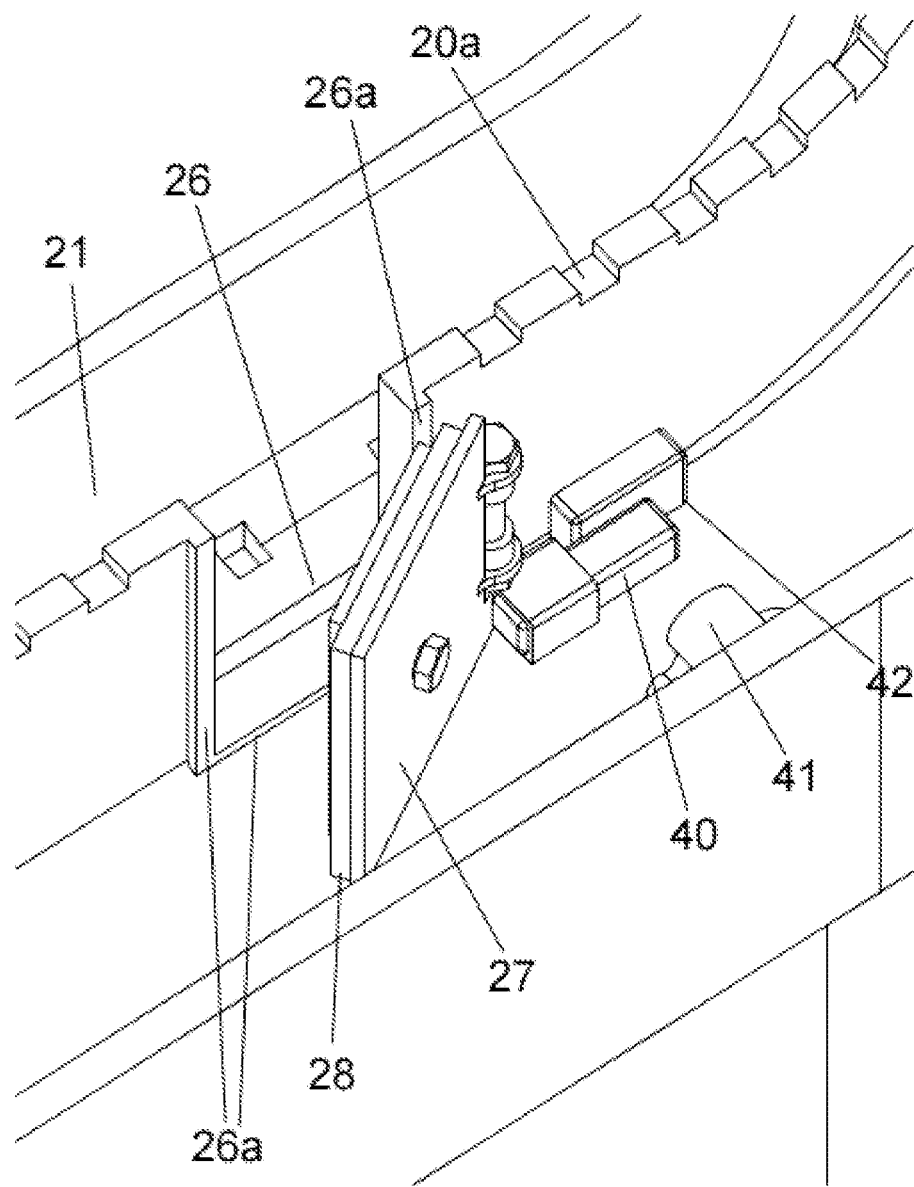
FIG. 21 is a structural schematic diagram of a second water valve and a second control device in the sixth embodiment.

Referring to FIG. 19 to FIG. 21, the difference between the third embodiment and the first embodiment or the second embodiment lies in that, in the third embodiment, the control device comprises a permanent magnet 38 embedded on the valve body 11, an electromagnet 39 arranged corresponding to the permanent magnet 38 and embedded on the circular ring 10, and a controller which is electrically connected with the electromagnet 39 and is used for controlling the on and off of a power supply of the electromagnet 39 and the intensity of the electrifying current of the electromagnet 39;

when the controller button is pressed, the electromagnet 39 is electrified;

when the electromagnet 39 is electrified, upward thrust is applied to the corresponding end of the permanent magnet 38, so that the free end of the valve body 11 is opened upwards;

the intensity of the electrifying current of the electromagnet 39 is in direct proportion to the pressure applied when the controller button is pressed;

therefore, the opening size of the valve body 11 can be controlled through the magnitude of the pressure applied to the controller button; and when the electromagnet 39 is powered off, the free end of the valve body 11 is closed downwards under the combined action of the self gravity of the valve body 11 and the attraction force of the permanent magnet 38 to the magnetic core of the electromagnet 39.

The second control device comprises a permanent magnet 40 embedded on the second valve body 27, an electromagnet 41 arranged corresponding to the permanent magnet 40 and fixedly connected to the bottom of the box body 18, and limiting rubber 42 arranged corresponding to the permanent magnet 40 and fixedly connected to the annular partition plate 20, and a second controller which is electrically connected with the electromagnet 41 and is used for controlling the on and off of a power supply of the electromagnet 41;

when the second controller button is pressed, the electromagnet 41 is electrified;

when the electromagnet 41 is electrified, thrust is applied to the tail end of the permanent magnet 40, so that the tail end of the permanent magnet 40 rotates to be tightly attached to the limiting rubber 42, and the second valve body 27 is opened;

when the electromagnet 41 is powered off, the attraction force between the free end of the permanent magnet 40 attached to the limiting rubber 42 and the magnetic core of the electromagnet 41 can drive the second valve body 27 to complete a gradually accelerated closing process within preset time; and therefore, after the electromagnet 41 is powered off, the toilet bowl 1 can be continuously flushed for a certain period of time, so that the time for pressing the second controller button is shortened.

Embodiment IV

Referring to FIG. 1 to FIG. 17, the present disclosure also provides a flushing toilet, comprising a toilet bowl 1, a toilet body 2 and a toilet bottom 3 integrally formed with the toilet bowl 1 and the toilet body 2, a toilet bowl 1 being provided at the lower end thereof with a trap 4, wherein a sewage receiving area 6, which is inclined and is specially arranged for changing a sewage falling speed and direction, is provided on a side, corresponding to a sewage falling direction, of the upper end of a trap 4 and in an area with a certain height;

a water sealing surface 44 of the trap 4 is located below the sewage receiving area 6, and a horizontal cross-sectional area 43 of the aperture of the top end of the trap 4 is slightly larger than the area of the water sealing surface 44;

a water flushing port 7 is provided in the upper end of the sewage receiving area 6;

a water storage cavity 5 is formed among the toilet body 2, the toilet bowl 1 and the toilet bottom 3;

the water flushing port 7 is in communication with the water storage cavity 5;

a water valve is arranged at an intake end of the water flushing port 7;

the toilet is also provided with a control device for controlling the opening and closing of the water valve and controlling the opening size of the water valve;

in addition, the toilet is further provided with a water inlet system for injecting water into the water storage cavity 5;

therefore, when small excrement is discharged, the water valve is opened slightly in front of the small excrement falling into the sewage receiving area 6 through the control device, so that the water storage cavity 5 flushes small-flow water into the sewage receiving area 6 through the water flushing port 7, and then the small excrement can slide into a water seal under the combined action of kinetic energy of the excrement, timely cooperation between small-flow flushing water flow blocking and flushing, and optimal guidance of the sewage receiving area 6 to the speed and direction of falling sewage, thereby preventing sewage splashing and odor emission; sewage traces left at the sewage receiving area 6 are also quickly flushed with small-flow flushing water, thereby preventing sewage attachment and odor emission; and when large excrement is discharged, the water valve is opened obviously in front of the large excrement falling into the sewage receiving area 6 through the control device, so that the water storage cavity 5 flushes large-flow water into the sewage receiving area 6 through the water flushing port 7, and then the large excrement can be discharged towards an outlet of the trap 4 under the combined action of kinetic energy of the excrement, timely cooperation between large-flow flushing water flow blocking and flushing, and optimal guidance of the sewage receiving area 6 to the speed and direction of falling sewage, so that sewage can be flushed away immediately with a small amount of flushing water, thereby saving on water and preventing sewage splashing and odor emission.

One side of the bottom, corresponding to the bottom of a sewage sliding track, of the trap 4, including the sewage receiving area 6, is integrally in a streamlined design; and when sewage slides into the water seal along the sewage receiving area 6 and then is discharged to a water outlet in the tail end of the trap 4, the moving track is a smooth and streamlined moving track.

The bottom of the toilet body 2 is attached to the ground, the toilet bottom 3 is flush with the bottom of the toilet body 2 or slightly higher than the bottom of the toilet body 2, and the trap 4 is generally located below the toilet bottom 3;

therefore, the distance between the water flushing port 7 and the hip and the distance between the sewage receiving area 6 and the hip are large enough, the kinetic energy generated when sewage makes contact with the sewage receiving area 6 is larger, and sewage can be flushed away with a smaller amount of flushing water; and therefore, the effective volume of the water storage cavity 5 can be greatly increased.

When floor tiles are laid in the washroom, a concave cavity is reserved at the position corresponding to the trap 4, and the trap 4 extends into the reserved concave cavity when the toilet is installed.

The water valve is composed of a circular ring 10 and a valve body 11, the outer circumferential surface of the circular ring 10 is connected with the inner circumferential surface of the water flushing port 7 in a sealed and embedded mode, the valve body 11 is rotatably hinged to the top of the circular ring 10, a rubber sheet 12 is arranged on the valve body 11, and when the free end of the valve body 11 rotates downwards until the rubber sheet 12 of the valve body 11 is attached to the top surface of the circular ring 10, the water valve is closed;

a torsion spring 13 is connected between the valve body 11 and the circular ring 10, and the acting force of the torsion spring 13 tends to close the water valve;

the control device comprises a fixed pulley 14 arranged on the rear side wall of the toilet body 2 and a flexible steel wire 15 of which the lower end is connected with the free end of the valve body 11; a support of the fixed pulley 14 is adhered or embedded to the toilet body 2;

the free end of the flexible steel wire 15 surrounds the fixed pulley 14 and extends out of the top of the right or left side wall of the toilet body 2 to the outer side of the toilet body 2;

a pull ring 16 is arranged at the end part of the free end of the flexible steel wire 15;

when the pull ring 16 is handheld and the free end of the valve body 11 is pulled to rotate upwards through the flexible steel wire 15 and the fixed pulley 14, the water valve is opened; and when the pull ring 16 is loosened, the free end of the valve body 11 rotates under the combined action of the self gravity of the valve body 11 and the torsion of the torsion spring 13 until the rubber sheet 12 of the valve body 11 is tightly attached to the top surface of the circular ring 10, and the water valve is closed.

A matched annular top cover 17 is buckled above the top of the toilet body 2 and the top of the toilet bowl 1;

the whole inner ring of the annular top cover 17 extends into the inner side of the top of the toilet bowl 1 by about 2 cm;

the annular top cover 17 is of a hollow box type structure and is composed of a box body 18 and a box cover 19 buckled with the box body 18;

a circle of annular partition plate 20 is arranged in the box body 18 and divides the box body 18 into two areas such as a water flushing tank 21 and a water storage tank 23;

a plurality of water outlet holes 22 are uniformly distributed in the inner side of the bottom of the water flushing tank 21, and the water outlet holes 22 respectively correspond to the inner side of the top of the toilet bowl 1;

a water rinsing port 26 is formed between the water flushing tank 21 and the water storage tank 23, and a second water valve 46 is arranged at the water rinsing port 26;

in addition, the toilet is further provided with a second control device for controlling the opening and closing of the second water valve 46; and moreover, the toilet is further provided with a second water inlet system for supplying water for the water storage tank 23, and a water storage tank inlet end 24 is connected with the second water inlet system.

The annular top cover 17 can be formed by injection molding of a plastic material.

The second water valve 46 is composed of a second valve body 27 which is rotatably hinged to the water rinsing port 26, the rubber sheet 28 is arranged on the second valve body 27, and when the free end of the second valve body 27 rotates until the rubber sheet 28 of the second valve body 27 is attached to the matched surface 26a of the water rinsing port 26, the second water valve body is closed;

a torsion spring 29 is connected between the second valve body 11 and the annular partition plate 10, and the acting force of the torsion spring 29 tends to close the second valve body 27;

the second control device comprises a flexible steel wire 30 connected with the second valve body 27;

the free end of the flexible steel wire 30 extends out of a top opening 18a of the box body 18 to the outer side of the annular top cover 17;

a pull ring 31 is arranged at the end part of the free end of the flexible steel wire 30;

therefore, the second valve body 27 can be pulled to be opened through the pull ring 31 and the flexible steel wire 30; and when the pull ring 31 is loosened, the second valve body 27 is automatically closed under the action of the torsion of the torsion spring 29.

The second water inlet system comprises a water storage pipe 32 arranged between the water storage tank inlet end 24 and a water outlet of the wash basin of the washroom;

the pipe diameter height and the installation height of the water storage pipe 32 correspond to those of the water storage tank 23;

a water storage pipe inlet end 33 is connected with the water outlet of the wash basin of the washroom through a hose, and a water storage pipe outlet end 34 is connected with the water storage tank inlet end 24 through a hose;

a plurality of overflow ports 20*a* with the height of about 2 mm are uniformly distributed in the top of the annular partition plate 20, so that when the water storage pipe 32 and the water storage tank 23 are full of water, waste water continuously discharged into the water storage pipe 32 and the water storage tank 23 from the wash basin flows into the water flushing tank 21 through the overflow ports 20*a* and is discharged into the toilet bowl 1 through the water outlet holes 22, and the toilet bowl 1 is automatically flushed; and therefore, along with high-frequency use of the wash basin, the toilet bowl 1 is frequently and automatically flushed with waste water in the wash basin, sewage traces and bacteria which are difficult to be really flushed and are difficult to observe by naked eyes during normal toilet flushing are thoroughly flushed, generation of peculiar smell of the toilet is completely eradicated, and the problem that the toilet needs to be manually flushed frequently is solved.

The water storage pipe 32 can be made of porcelain or imitation porcelain hard plastic, and the back surface of the water storage pipe 32 is fixedly connected to a wall tile of the washroom through tile glue.

When the wash basin of the washroom is far away from the toilet, the water storage pipe 32 can also be a concealed pipe, and a common pipe is adopted and is pre-buried after floor tiles are laid and before wall tiles are attached according to the height of the toilet.

The water inlet system comprises a water inlet pipe 25 which is arranged at the rear end of the annular top cover 17 and integrally formed with the box body 18, and a water inlet pipe outlet end 25*b* points to the water storage cavity 5;

a water inlet valve 35 is installed at the water inlet pipe outlet end 25*b* and located in the water storage cavity 5;

a handle 36 is arranged on the water inlet valve 35;

the tail end of the handle 36 is fixedly connected with a floating ball 37;

a water inlet pipe inlet end 25*a* is connected with a water pipe through a hose;

therefore, when the water level in the water storage cavity 5 rises to a preset position, the floating ball 37 drives the free end of the handle 36 to rotate upwards, so that the water inlet valve 35 is closed; and when the water level in the water storage cavity 5 drops, the floating ball 37 without buoyancy support drives the free end of the handle 36 to rotate downwards under the action of self gravity of the floating ball 37, so that the water inlet valve 35 is opened, and tap water is injected into the water storage cavity 5.

The tops of the left side wall and the right side wall of the toilet body 2 are respectively located on the outer side of the top of the toilet bowl 1 by about 7 cm so that the widths of the two sides of the annular top cover 17 are similar to those of the two sides of a squatting pan, and therefore the sitting posture or the squatting posture can be freely selected according to personal preference;

an integrally formed top plate 8 is arranged between the front end of the top of the toilet body 2 and the front end of the top of the toilet bowl 1; and a reinforcing rib plate 9 is arranged between the toilet bowl 1 and the toilet bottom 3.

Toilet cover installing holes 17*a* are formed in the rear end of the annular top cover 17, and a toilet cover is installed above the annular top cover 17 through the toilet cover installing holes 17*a*.

The toilet cover may be a smart toilet cover or a common toilet cover.

The toilet cover is not required to be installed above the annular top cover 17, and the annular top cover 17 is simply used as a squatting pan.

The flushing toilet can be designed to be a direct flushing type toilet and can also be designed to be a siphon type toilet.

Installation of the toilet: when floor tiles are laid in the washroom, the floor is generally raised by more than 15 cm;

in the embodiment, the lowest point of the trap 4 is about 13 cm lower than the toilet bottom 3;

when floor tiles are laid, a concave cavity with the depth of not smaller than 13 cm is reserved in the position corresponding to the trap 4;

when the toilet is installed, the trap 4 generally extends into the reserved concave cavity, and the outlet end of the trap 4 is in butt joint with a preset drain outlet of the toilet;

the water storage pipe 32 is made of ceramic materials matched with wall tiles of the toilet, the back surface of the water storage pipe 32 is bonded and fixed to the wall tiles through ceramic tile glue, the installation height of the water storage pipe 32 corresponds to that of the water storage tank 23, the water storage pipe inlet end 33 is connected with the water outlet of the wash basin of the washroom through a hose, and the water storage pipe outlet end 34 is connected with the water storage tank inlet end 24 through a hose;

as the waste water in the wash basin is directly discharged into the toilet, a drain pipe and a trap do not need to be specially embedded on the wash basin, and the saved cost is approximately equivalent to the cost for installing the water storage pipe 32;

the water storage pipe 32 can be a single water storage pipe or formed by connecting two water storage pipes through a connector, or can be a corner; and as the toilet and the wash basin can be arranged side by side generally and are close to each other, only one single water storage pipe 32 is needed generally.

The using method and the working principle are as follows: when a cushion ring is installed, the user can be in a sitting posture or a squatting posture, when the user is in the sitting posture, the cushion ring of the toilet is put down, and when the user is in the squatting posture, the user directly squats on the annular top cover 17;

when urinal is flushed with water, the pull ring 31 is pulled, and the toilet is flushed with the waste water in wash basin stored in the water storage tank 23 and the water storage pipe 32, so that a large amount of water resources are saved;

during defecation, when small excrement is discharged, the pull ring 16 is slightly pulled in advance, water is flushed to the sewage receiving area 6 in a small-flow mode, the small excrement slides into the water seal under the combined action of kinetic energy of the excrement, small-flow flushing water flow blocking and flushing in advance slightly, sewage traces left at the sewage receiving area 6 are also quickly flushed with small-flow flushing water, thereby preventing sewage attachment and odor emission and using an extremely small amount of flushing water in one time;

when large excrement is discharged, the pull ring 16 is pulled slightly in advance with a large size to flush the sewage receiving area 6 with a large flow rate, or the pull ring 31 can be pulled at the same time, and large excrement can be discharged to the outlet of the trap 4 according to the guidance of the trap 4 under the combined action of kinetic energy of the excrement and large flushing water flow blocking and flushing;

due to the fact that kinetic energy generated when sewage falls off, optimal guidance of the trap 4 to the speed and direction, and timely cooperation between flushing water flow blocking and flushing are fully utilized, the trap 4 is integrally streamlined, the pipe diameter of the trap 4 is greatly smaller than that of an existing toilet, the large excrement can be flushed away instantly with a small amount of flushing water, thereby saving on water and preventing sewage splashing and odor emission;

after defecation is completed, the pull ring 31 is pulled, the toilet bowl 1 is comprehensively flushed with using the waste water in the wash basin stored in the water storage tank 23 and the water storage pipe 32, and meanwhile waste paper is flushed away; and due to the fact that the waste water in the wash basin is fully utilized for flushing the toilet, the total water consumption is greatly smaller than that of an existing toilet while deodorization and splashing prevention are achieved, and excess waste water in the wash basin automatically flushes the toilet bowl 1 at any time, so that the generation of peculiar smell of the toilet can be basically avoided, and the problem that the toilet needs to be manually flushed frequently is solved.

Embodiment V

Referring to FIG. 18, the difference between the fifth embodiment and the fourth embodiment lies in that, in the fourth embodiment, the toilet bottom 3 is flush with or slightly higher than the bottom of the toilet body 2 (the bottom of the toilet body 2 is attached to the ground); in the fifth embodiment, the toilet bottom 3 is about 5-13 cm higher than the bottom (ground) of the toilet body 2; and the lowest point of the trap 4 is lower than the bottom (ground) of the toilet body 2 by a certain distance, or the trap 4 and the toilet body 5 are approximately flush.

Embodiment VI

Referring to FIG. 19 to FIG. 21, the difference between the sixth embodiment and the fourth embodiment or the fifth embodiment lies in that, in the sixth embodiment, the control device comprises a permanent magnet 38 embedded on the valve body 11, an electromagnet 39 arranged corresponding to the permanent magnet 38 and embedded on the circular ring 10, and a controller which is electrically connected with the electromagnet 39 and is used for controlling the on and off of a power supply of the electromagnet 39 and the intensity of the electrifying current of the electromagnet 39;

when the controller button is pressed, the electromagnet 39 is electrified;

when the electromagnet 39 is electrified, upward thrust is applied to the corresponding end of the permanent magnet 38, so that the free end of the valve body 11 is opened upwards;

the intensity of the electrifying current of the electromagnet 39 is in direct proportion to the pressure applied when the controller button is pressed;

therefore, the opening size of the valve body 11 can be controlled through the magnitude of the pressure applied to the controller button; and when the electromagnet 39 is powered off, the free end of the valve body 11 is closed downwards under the combined action of the self gravity of the valve body 11 and the attraction force of the permanent magnet 38 to the magnetic core of the electromagnet 39.

The second control device comprises a permanent magnet 40 embedded on the second valve body 27, an electromagnet 41 arranged corresponding to the permanent magnet 40 and fixedly connected to the bottom of the box body 18, and limiting rubber 42 arranged corresponding to the permanent magnet 40 and fixedly connected to the annular partition plate 20, and a second controller which is electrically connected with the electromagnet 41 and is used for controlling the on and off of a power supply of the electromagnet 41; when the second controller button is pressed, the electromagnet 41 is electrified;

when the electromagnet 41 is electrified, thrust is applied to the tail end of the permanent magnet 40, so that the tail end of the permanent magnet 40 rotates to be tightly attached to the limiting rubber 42, and the second valve body 27 is opened;

when the electromagnet 41 is powered off, the attraction force between the free end of the permanent magnet 40 attached to the limiting rubber 42 and the magnetic core of the electromagnet 41 can drive the second valve body 27 to complete a gradually accelerated closing process within preset time; and therefore, after the electromagnet 41 is powered off, the toilet bowl 1 can be continuously flushed for a certain period of time, so that the time for pressing the second controller button is shortened.

When the toilet is an intelligent toilet, the controller button and the second controller button are arranged on an operation platform. When the toilet is a common toilet, the controller button and the second controller button are arranged on the side wall of the toilet body 2; or, the controller button is arranged on the side wall of the toilet bowl 2, and the second controller button is arranged on the table top of the wash basin of the washroom or the wall surface of the wash basin, so that the second controller button can be triggered to flush the toilet bowl 1 during hand washing after defecation.

INDUSTRIAL APPLICABILITY

The toilet belongs to the field of sanitary appliances, is used for daily life hygiene, and can be installed in places such as family washrooms and public washrooms.

What is claimed is:

1. A flushing method for a toilet, wherein a sewage receiving area (6), which is inclined and is configured to change a sewage falling speed and a sewage falling direction, is provided on a side, corresponding to the sewage falling direction, of an upper end of a trap (4) and in an area with a height;

a water sealing surface of the trap (4) is located below the sewage receiving area (6), and a horizontal cross-sectional area of an aperture of a top end of the trap (4) is larger than an area of the water sealing surface;

a water flushing port (7) is provided in an upper end of the sewage receiving area (6);

a water storage cavity (5) is formed among a toilet body (2), a toilet bowl (1) and a toilet bottom (3);

the water flushing port (7) is in communication with the water storage cavity (5);

a first water valve is arranged at an intake end of the water flushing port (7);

the toilet is provided with a control device, the control device is configured for controlling the opening and closing of the first water valve and controlling an opening size of the first water valve; and the toilet is further provided with a water inlet system, the water inlet system is configured for injecting water into the water storage cavity (5).

2. The flushing method according to claim 1, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

a water flushing tank (21) arranged around the inner ring of the annular top cover (17) and a water storage tank (23) arranged around an outer side of the water flushing tank (21) are arranged in the annular top cover (17);

a plurality of water outlet holes (22) are uniformly distributed in the inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

3. The flushing method according to claim 2, wherein the second water inlet system comprises a water storage pipe (32) arranged between the water storage tank inlet end (24) and a water outlet of the wash basin of the washroom;

a pipe diameter height and an installation height of the water storage pipe (32) correspond to those of the water storage tank (23);

a water storage pipe inlet end (33) is connected with the water outlet of the wash basin of the washroom through a hose, and a water storage pipe outlet end (34) is connected with the water storage tank inlet end (24) through a hose; and a plurality of overflow ports (20a) with the height of 2 mm are formed between the upper end of the water flushing tank (21) and the upper end of the water storage tank (23), so that when the water storage pipe (32) and the water storage tank (23) are full of water, waste water continuously discharged into the water storage pipe (32) and the water storage tank (23) from the wash basin flows into the water flushing tank (21) through the overflow ports (20a) and is discharged into the toilet bowl (1) through the water outlet holes (22), and the toilet bowl (1) is automatically flushed.

4. The flushing method according to claim 1, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

a water flushing tank (21) arranged around the inner ring of the annular top cover (17) and a water storage tank (23) arranged around an outer side of the water flushing tank (21) are arranged in the annular top cover (17);

a plurality of water outlet holes (22) are uniformly distributed in the inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

5. The flushing method according to claim 4, wherein the second water inlet system comprises a water storage pipe (32) arranged between the water storage tank inlet end (24) and a water outlet of the wash basin of the washroom;

a pipe diameter height and an installation height of the water storage pipe (32) correspond to those of the water storage tank (23);

a water storage pipe inlet end (33) is connected with the water outlet of the wash basin of the washroom through a hose, and a water storage pipe outlet end (34) is connected with the water storage tank inlet end (24) through a hose;

a plurality of overflow ports (20a) with the height of 2 mm are formed between the upper end of the water flushing tank (21) and the upper end of the water storage tank (23), so that when the water storage pipe (32) and the water storage tank (23) are full of water, waste water continuously discharged into the water storage pipe (32) and the water storage tank (23) from the wash basin flows into the water flushing tank (21) through the overflow ports (20a) and is discharged into the toilet bowl (1) through the water outlet holes (22), and the toilet bowl (1) is automatically flushed.

6. A flushing toilet, comprising a toilet bowl (1), a toilet body (2) and a toilet bottom (3) integrally formed with the toilet bowl (1) and the toilet body (2), a toilet bowl (1) being provided at a lower end thereof with a trap (4), wherein a sewage receiving area (6), which is inclined and is configured to change a sewage falling speed and a sewage falling direction, is provided on a side, corresponding to the sewage falling direction, of an upper end of a trap (4) and in an area with a height;

a water sealing surface of the trap (4) is located below the sewage receiving area (6), and a horizontal cross-sectional area of an aperture of a top end of the trap (4) is larger than an area of the water sealing surface;

a water flushing port (7) is provided in an upper end of the sewage receiving area (6);

a water storage cavity (5) is formed among the toilet body (2), the toilet bowl (1) and the toilet bottom (3);

the water flushing port (7) is in communication with the water storage cavity (5);

a first water valve is arranged at an intake end of the water flushing port (7);

the toilet is provided with a control device, the control device is configured for controlling the opening and closing of the first water valve and controlling an opening size of the first water valve;

the toilet is further provided with a water inlet system, the water inlet system is configured for injecting water into the water storage cavity (5).

7. The flushing toilet according to claim 6, wherein the bottom of the toilet body (2) is attached to the ground, the toilet bottom (3) is flush with the bottom of the toilet body (2) or higher than the bottom of the toilet body (2), and the trap (4) is generally located below the toilet bottom (3).

8. The flushing toilet according to claim 7, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

the annular top cover (17) is of a hollow box type structure and is composed of a box body (18) and a box cover (19) buckled with the box body (18);

an annular partition plate (20) is arranged in the box body (18) and divides the box body (18) into two areas of a water flushing tank (21) and a water storage tank (23);

a plurality of water outlet holes (22) are uniformly distributed in an inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

9. The flushing toilet according to claim 6, wherein the first water valve is composed of a circular ring (10) and a valve body (11), an outer circumferential surface of the circular ring (10) is connected with an inner circumferential surface of the water flushing port (7) in a sealed and embedded mode, the valve body (11) is rotatably hinged to the top of the circular ring (10), a rubber sheet (12) is arranged on the valve body (11), and when a free end of the valve body (11) rotates downwards until the rubber sheet (12) of the valve body (11) is attached to a top surface of the circular ring (10), the first water valve is closed;

a torsion spring (13) is connected between the valve body (11) and the circular ring (10), and an acting force of the torsion spring (13) tends to close the first water valve;

the control device comprises a fixed pulley (14) arranged on a rear side wall of the toilet body (2) and a flexible steel wire (15) of which a lower end is connected with the free end of the valve body (11);

a free end of the flexible steel wire (15) surrounds the fixed pulley (14) and extends out of the top of a right or left side wall of the toilet body (2) to an outer side of the toilet body (2);

a pull ring (16) is arranged at an end part of the free end of the flexible steel wire (15);

when the pull ring (16) is handheld and the free end of the valve body (11) is pulled to rotate upwards through the flexible steel wire (15) and the fixed pulley (14), the first water valve is opened; and when the pull ring (16) is loosened, the free end of the valve body (11) rotates under a combined action of the self gravity of the valve body (11) and the torsion of the torsion spring (13) until the rubber sheet (12) of the valve body (11) is tightly attached to the top surface of the circular ring (10), and the first water valve is closed.

10. The flushing toilet according to claim 9, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

the annular top cover (17) is of a hollow box type structure and is composed of a box body (18) and a box cover (19) buckled with the box body (18);

an annular partition plate (20) is arranged in the box body (18) and divides the box body (18) into two areas of a water flushing tank (21) and a water storage tank (23);

a plurality of water outlet holes (22) are uniformly distributed in an inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

11. The flushing toilet according to claim 6, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

the annular top cover (17) is of a hollow box type structure and is composed of a box body (18) and a box cover (19) buckled with the box body (18);

an annular partition plate (20) is arranged in the box body (18) and divides the box body (18) into two areas of a water flushing tank (21) and a water storage tank (23);

a plurality of water outlet holes (22) are uniformly distributed in an inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

12. The flushing toilet according to claim 11, wherein the second water valve is composed of a second valve body (27) which is rotatably hinged to the water rinsing port (26), the rubber sheet (28) is arranged on the second valve body (27), and when a free end of the second valve body (27) rotates until the rubber sheet (28) of the second valve body (27) is attached to a matched surface (26a) of the water rinsing port (26), the second water valve body is closed;

a torsion spring (29) is connected between the second valve body (11) and the annular partition plate (20), and the acting force of the torsion spring (29) tends to close the second valve body (27);

the second control device comprises a flexible steel wire (30) connected with the second valve body (27);

the free end of the flexible steel wire (30) extends out of a top opening (18a) of the box body (18) to an outer side of the annular top cover (17);

a pull ring (31) is arranged at the end part of the free end of the flexible steel wire (30);

therefore, the second valve body (27) can be pulled to be opened through the pull ring (31) and the flexible steel wire (30); and when the pull ring (31) is loosened, the second valve body (27) is automatically closed under the action of the torsion of the torsion spring (29).

13. The flushing toilet according to claim 11, wherein the second water inlet system comprises a water storage pipe (32) arranged between the water storage tank inlet end (24) and a water outlet of the wash basin of the washroom;

a pipe diameter height and an installation height of the water storage pipe (32) correspond to those of the water storage tank (23);

a water storage pipe inlet end (33) is connected with the water outlet of the wash basin of the washroom through a hose, and a water storage pipe outlet end (34) is connected with the water storage tank inlet end (24) through a hose;

a plurality of overflow ports (20a) with the height of 2 mm are uniformly distributed in the top of the annular partition plate (20), so that when the water storage pipe (32) and the water storage tank (23) are full of water, waste water continuously discharged into the water storage pipe (32) and the water storage tank (23) from the wash basin flows into the water flushing tank (21) through the overflow ports (20a) and is discharged into the toilet bowl (1) through the water outlet holes (22), and the toilet bowl (1) is automatically flushed.

14. The flushing toilet according to claim 11, wherein the water inlet system comprises a water inlet pipe (25) which is arranged at the rear end of the annular top cover (17) and integrally formed with the box body (18), and a water inlet pipe outlet end (25b) points to the water storage cavity (5);

a water inlet valve (35) is installed at the water inlet pipe outlet end (25b) and located in the water storage cavity (5);

a handle (36) is arranged on the water inlet valve (35);

a tail end of the handle (36) is fixedly connected with a floating ball (37);

a water inlet pipe inlet end (25a) is connected with a water pipe through a hose;

therefore, when the water level in the water storage cavity (5) rises to a preset position, the floating ball (37) drives the free end of the handle (36) to rotate upwards, so that the water inlet valve (35) is closed; and when the water level in the water storage cavity (5) drops, the floating ball (37) without buoyancy support drives the free end of the handle (36) to rotate downwards under the action of self gravity of the floating ball (37), so that the water inlet valve (35) is opened, and tap water is injected into the water storage cavity (5).

15. The flushing toilet according to claim 11, wherein the second water valve is composed of a second valve body (27) which is rotatably hinged to the water rinsing port (26), the rubber sheet (28) is arranged on the second valve body (27), and when the second valve body (27) rotates until the rubber sheet (28) of the second valve body (27) is attached to the matched surface (26a) of the water rinsing port (26), the second water valve body is closed;

the second control device comprises a permanent magnet (40) embedded on the second valve body (27), an electromagnet (41) arranged corresponding to the permanent magnet (40) and fixedly connected to the bottom of the box body (18), and limiting rubber (42) arranged corresponding to the permanent magnet (40) and fixedly connected to the annular partition plate (20), and a second controller which is electrically connected with the electromagnet (41) and is used for controlling the on and off of a power supply of the electromagnet (41);

when a second controller button is pressed, the electromagnet (41) is electrified;

when the electromagnet (41) is electrified, thrust is applied to a tail end of the permanent magnet (40), so that the tail end of the permanent magnet (40) rotates to be attached to the limiting rubber (42), and the second valve body (27) is opened;

when the electromagnet (41) is powered off, the attraction force between a free end of the permanent magnet (40) attached to the limiting rubber (42) and a magnetic core of the electromagnet (41) can drive the second valve body (27) to complete a gradually accelerated closing process within preset time; and therefore, after the electromagnet (41) is powered off, the toilet bowl (1) is able to be continuously flushed for a period of time, so that the time for pressing the second controller button is shortened.

16. The flushing toilet according to claim 6, wherein the first water valve is composed of a circular ring (10) and a valve body (11), an outer circumferential surface of the circular ring (10) is connected with an inner circumferential surface of the water flushing port (7) in a sealed and embedded mode, the valve body (11) is rotatably hinged to the top of the circular ring (10), a rubber sheet (12) is arranged on the valve body (11), and when a free end of the valve body (11) rotates downwards until the rubber sheet (12) of the valve body (11) is attached to the top surface of the circular ring (10), the first water valve is closed;

the control device comprises a permanent magnet (38) embedded on the valve body (11), an electromagnet (39) arranged corresponding to the permanent magnet (38) and embedded on the circular ring (10), and a controller which is electrically connected with the electromagnet (39) and is used for controlling the on and off of a power supply of the electromagnet (39) and the intensity of the electrifying current of the electromagnet (39);

when a controller button is pressed, the electromagnet (39) is electrified;

when the electromagnet (39) is electrified, upward thrust is applied to the corresponding end of the permanent magnet (38), so that the free end of the valve body (11) is opened upwards;

the intensity of the electrifying current of the electromagnet (39) is in direct proportion to the pressure applied when the controller button is pressed;

therefore, the opening size of the valve body (11) can be controlled through the magnitude of the pressure applied to the controller button; and when the electromagnet (39) is powered off, the free end of the valve body (11) is closed downwards under the combined action of the self gravity of the valve body (11) and the attraction force of the permanent magnet (38) to a magnetic core of the electromagnet (39).

17. The flushing toilet according to claim 11, wherein the tops of the left side wall and the right side wall of the toilet body (2) are respectively located on an outer side of the top of the toilet bowl (1) by 7 cm so that widths of two sides of the annular top cover (17) are configured for sitting or squatting;

an integrally formed top plate (8) is arranged between a front end of the top of the toilet body (2) and a front end of the top of the toilet bowl (1); and a reinforcing rib plate (9) is arranged between the toilet bowl (1) and the toilet bottom (3).

18. The flushing toilet according to claim 6, wherein a matched annular top cover (17) is buckled above the top of the toilet body (2) and the top of the toilet bowl (1);

a whole inner ring of the annular top cover (17) extends into an inner side of the top of the toilet bowl (1) by 2 cm;

the annular top cover (17) is of a hollow box type structure and is composed of a box body (18) and a box cover (19) buckled with the box body (18);

an annular partition plate (20) is arranged in the box body (18) and divides the box body (18) into two areas of a water flushing tank (21) and a water storage tank (23);

a plurality of water outlet holes (22) are uniformly distributed in an inner side of the bottom of the water flushing tank (21), and the water outlet holes (22) respectively correspond to the inner side of the top of the toilet bowl (1);

a water rinsing port (26) is formed between the water flushing tank (21) and the water storage tank (23), and a second water valve is arranged at the water rinsing port (26);

the toilet is further provided with a second control device for controlling the opening and closing of the second water valve; and the toilet is further provided with a second water inlet system for supplying water for the water storage tank (23), and a water storage tank inlet end (24) is connected with the second water inlet system.

* * * * *